US011722912B2

(12) United States Patent
Gummadi et al.

(10) Patent No.: US 11,722,912 B2
(45) Date of Patent: Aug. 8, 2023

(54) RADIO LINK FAILURE HANDLING IN AN INTEGRATED ACCESS BACKHAUL NETWORK

(71) Applicant: QUALCOMM Incorporated, San Diego, CA (US)

(72) Inventors: Bapineedu Chowdary Gummadi, Hyderabad (IN); Naeem Akl, Somerville, NJ (US); Hem Agnihotri, Benares (IN); Karl Georg Hampel, Hoboken, NJ (US); Navid Abedini, Basking Ridge, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 250 days.

(21) Appl. No.: 17/157,812

(22) Filed: Jan. 25, 2021

(65) Prior Publication Data
US 2022/0240103 A1  Jul. 28, 2022

(51) Int. Cl.
*H04W 24/02*  (2009.01)
*H04W 76/19*  (2018.01)
(Continued)

(52) U.S. Cl.
CPC ....... *H04W 24/02* (2013.01); *H04W 74/0833* (2013.01); *H04W 76/19* (2018.02);
(Continued)

(58) Field of Classification Search
CPC . H04W 24/02; H04W 74/0833; H04W 76/19; H04W 76/27; H04W 76/30;
(Continued)

(56) References Cited

U.S. PATENT DOCUMENTS

2021/0377757 A1\* 12/2021 Liu ................. H04L 1/1858
2021/0378041 A1\* 12/2021 Narasimha .......... H04W 40/02
(Continued)

FOREIGN PATENT DOCUMENTS

EP          3846546 A1    7/2021
KR       20200035850 A    4/2020
(Continued)

OTHER PUBLICATIONS

International Search Report and Written Opinion—PCT/US2022/011649—ISA/EPO—dated Apr. 22, 2022.
(Continued)

*Primary Examiner* — Will W Lin
(74) *Attorney, Agent, or Firm* — Qualcomm Incorporated

(57) ABSTRACT

When an integrated access backhaul (IAB) node connected to a user equipment (UE) detects a radio link failure in a communication with an IAB donor, the IAB node may perform various features to cause the UE perform one or more features accordingly without explicitly indicating the radio link failure to the UE. The IAB node may detecting a radio link failure in a communication between the IAB node and an IAB donor, and determine whether the IAB node has recovered from the radio link failure. The IAB node may refrain from broadcasting one or more synchronization signal blocks (SSBs) to one or more UEs including a UE connected to the IAB node in response to determining that the IAB node has not recovered from the radio link failure.

28 Claims, 14 Drawing Sheets

(51) Int. Cl.
  *H04W 76/30* (2018.01)
  *H04W 76/27* (2018.01)
  *H04W 74/08* (2009.01)
  *H04W 80/02* (2009.01)
  *H04W 88/14* (2009.01)

(52) U.S. Cl.
  CPC ........... *H04W 76/27* (2018.02); *H04W 76/30* (2018.02); *H04W 80/02* (2013.01); *H04W 88/14* (2013.01)

(58) Field of Classification Search
  CPC ... H04W 80/02; H04W 88/14; H04W 36/305; H04W 88/085
  See application file for complete search history.

(56) References Cited

U.S. PATENT DOCUMENTS

| | | | |
|---|---|---|---|
| 2022/0007212 A1* | 1/2022 | Hwang | H04W 76/38 |
| 2022/0015011 A1* | 1/2022 | Liu | H04W 76/15 |
| 2022/0131793 A1* | 4/2022 | Ramachandra | H04W 36/305 |
| 2022/0141910 A1* | 5/2022 | Muhammad | H04W 40/34 370/329 |
| 2022/0182903 A1* | 6/2022 | Ishii | H04W 36/0058 |
| 2022/0217598 A1* | 7/2022 | Ishii | H04W 36/305 |
| 2022/0255689 A1* | 8/2022 | Wen | H04L 5/0032 |

FOREIGN PATENT DOCUMENTS

| | | |
|---|---|---|
| WO | WO-2020042945 A1 | 3/2020 |
| WO | WO-2021235351 A1 | 11/2021 |
| WO | WO-2022031045 A1 | 2/2022 |

OTHER PUBLICATIONS

Kyocera: "Further Discussion on Backhaul RLF Handling", 3GPP Draft, 3GPP TSG-RAN WG2#107-Bis, R2-1913655_IAB_BH-RLF-Notification, 3rd Generation Partnership Project (3GPP), Mobile Competence Centre, 650, Route Des Lucioles, F-06921 Sophia-Antipolis Cedex, France, vol. RAN WG2, No. Chongqing, China, Oct. 14, 2019-Oct. 18, 2019, Oct. 4, 2019 (Oct. 4, 2019), XP051805123, 6 Pages, Retrieved from the Internet: URL: https://ftp.3gpp.org/tsg_ran/WG2_RL2/TSGR2_107bis/Docs/R2-1913655.zip. R2-1913655_IAB_BH-RLF-notification .doc [Retrieved on Oct. 4, 2019] paragraph [02.1] paragraph [0003].

Sharp: "Issue of Loop Topology after RLF", 3GPP Draft, 3GPP TSG RAN WG2 Meeting #108, R2-1915766, 3rd Generation Partnership Project (3GPP), Mobile Competence Centre, 650, Route Des Lucioles, F-06921 Sophia-Antipolis Cedex, France, vol. RAN WG2, No. Reno, NV, U.S.A, Nov. 18, 2019-Nov. 22, 2019, Nov. 7, 2019 (Nov. 7, 2019), XP051817355, 3 Pages, Retrieved from the Internet: URL: https://ftp.3gpp.org/tsg_ran/WG2_RL2/TSGR2_108/Docs/R2-1915766.zip. R2-1915766.doc [Retrieved on Nov. 7, 2019] The Whole Document.

* cited by examiner

RADIO LINK FAILURE HANDLING IN AN INTEGRATED ACCESS BACKHAUL NETWORK

TECHNICAL FIELD

The technology discussed below relates generally to wireless communication networks, and more particularly, to techniques for handling a radio link failure in an integrated access backhaul network.

INTRODUCTION

In 5G New Radio wireless communication networks, resources may be shared between access networks and backhaul networks. For example, the wireless spectrum may be used for both access links (e.g., links between base stations and user equipment (UEs)) and backhaul links (e.g., links between base stations and the core network). In such integrated access backhaul (IAB) networks, the base station functionality can be logically separated into a central unit (CU) and one or more distributed units (DUs). The CU hosts the radio resource control (RRC), service data adaptation protocol (SDAP), and packet data convergence protocol (PDCP) layers that control the operation of one or more DUs. The DU hosts the radio link control (RLC), medium access control (MAC) and physical (PHY) layers. In an example IAB network architecture, the CU may be implemented at an edge IAB node, while multiple DUs may be distributed throughout the IAB network.

The CU in combination with one or more DUs, which may be co-located and/or distributed, may be referred to as a disaggregated base station or an IAB node. A disaggregated base station may be implemented within an IAB network or within other network configurations. The CU and DU(s) are connected via an F1 interface, which utilizes an F1 application protocol (F1-AP) to convey information between the CU and the DU(s). Enhancements to the F1-AP continue to be developed to support functionalities and features of disaggregated base stations.

BRIEF SUMMARY OF SOME EXAMPLES

The following presents a summary of one or more aspects of the present disclosure, in order to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in a form as a prelude to the more detailed description that is presented later.

Aspects of the present disclosure provide a method, system, device, and apparatus for handling a radio link failure in an integrated access backhaul (IAB). When an integrated access backhaul (IAB) node connected to a user equipment (UE) detects a radio link failure in a communication with an IAB donor, the IAB node may perform various features accordingly without explicitly indicating the radio link failure to the UE. By refraining from transmitting synchronization signals and/or reconfiguring the UE when the radio link failure is detected, the IAB node may be able to handle communication in case of the radio link failure.

In one example, a method of wireless communication by a IAB node is disclosed. The method includes detecting a radio link failure in a communication between the IAB node and an IAB donor, determining whether the IAB node has recovered from the radio link failure, and refraining from broadcasting one or more synchronization signal blocks (SSBs) to one or more UEs including a UE connected to the IAB node in response to determining that the IAB node has not recovered from the radio link failure.

In an aspect, detecting the radio link failure may include detecting the radio link failure in an upstream backhaul link of the IAB node.

In an aspect, detecting the radio link failure may include receiving a radio link failure indicator from a second IAB node connected to the IAB node, the radio link failure indicator indicating the radio link failure in an upstream backhaul link of the second IAB node, and determining the radio link failure in the communication between the IAB node and the IAB donor based on the radio link failure indicator.

In an aspect, determining that the IAB node has not recovered from the radio link failure may include determining that the IAB node has not recovered from the radio link failure within a recovery time threshold.

In an aspect, determining that the IAB node has not recovered from the radio link failure may include determining that the IAB node has not recovered from the radio link failure when the radio link failure is detected.

In an aspect, the method may further include determining, in response to detecting the radio link failure, whether a rate of data transfer to the UE is below a data transfer threshold, and transmitting, in response to determining that the rate of data transfer is below the data transfer threshold, to the UE at least one of an inactive mode trigger signal to trigger the UE to enter an inactive mode, or a release signal to cause the UE to release a connection between the UE and the IAB node. In an aspect, the data transfer threshold may be based on a type of the data transfer. In an aspect, the at least one of the inactive mode trigger signal or the release signal may be transmitted via a radio resource control (RRC) release message.

In an aspect, the method may further include reducing a maximum number of re-transmissions by the UE in response to detecting the radio link failure, the maximum number of re-transmissions indicating a maximum number of times the UE attempts to re-transmit data to the IAB node before determining a connection failure, and transmitting the reduced maximum number of re-transmission to the UE. In an aspect, the reduced maximum number of re-transmissions may be transmitted via an RRC reconfiguration message.

In an aspect, the method may further include reducing a maximum number of random access channel (RACH) attempts by the UE in response to detecting the radio link failure, the maximum number of RACH attempts indicating a maximum number of times the UE attempts to initiate a RACH process with the IAB node before determining a RACH failure, and transmitting the reduced maximum number of RACH attempts to the UE.

In an aspect, the method may further include reducing a transmit power value of the UE in response to detecting the radio link failure, and transmitting, to the UE, the reduced transmit power value of the UE. In an aspect, the reduced transmit power value may be transmitted to the UE via a media access control (MAC) control element (CE). In an aspect, the transmit power value may be a physical uplink shared channel (PUSCH) transmit power value of the UE.

In an aspect, the method may further include receiving one or more uplink transmissions from the UE after detecting the radio link failure, and performing, in response to the one or more uplink transmissions, at least one of: transmitting, to the UE, a negative acknowledgement (NACK) for each of the one or more uplink transmission received from the UE after detecting the radio link failure, or refraining from transmitting an acknowledgement (ACK) or the NACK for each of the one or more uplink transmission received from the UE after detecting the radio link failure.

In an aspect, the method may further include receiving uplink data from the UE after detecting the radio link failure, determining whether the uplink data is associated with a non-critical data activity, and holding, in response to determining that the uplink data is associated with the non-critical data activity, the uplink data at least until determining that the IAB node has recovered from the radio link failure. In an aspect, the method may further include discarding the uplink data in response to at least one of determining that the uplink data is associated with a critical data activity, or determining that the IAB node has not recovered from the radio link failure.

In another example, a IAB node for wireless communication is disclosed. The IAB node includes at least one processor, a transceiver communicatively coupled to the at least one processor, and a memory communicatively coupled to the at least one processor. The at least one processor may be configured to detect a radio link failure in a communication between the IAB node and an IAB donor, determine whether the IAB node has recovered from the radio link failure, and refrain from broadcasting one or more SSBs to one or more UEs including a UE connected to the IAB node in response to determining that the IAB node has not recovered from the radio link failure.

In another example, a non-transitory processor-readable storage medium having instructions for a IAB node thereon may be disclosed. The instructions, when executed by a processing circuit, cause the processing circuit to detect a radio link failure in a communication between the IAB node and an IAB donor, determine whether the IAB node has recovered from the radio link failure, and refrain from broadcasting one or more SSBs to one or more UEs including a UE connected to the IAB node in response to determining that the IAB node has not recovered from the radio link failure.

In a further example, a IAB node for wireless communication may be disclosed. The IAB node includes means for detecting a radio link failure in a communication between the IAB node and an IAB donor, means for determining whether the IAB node has recovered from the radio link failure, and means for refraining from broadcasting one or more SSBs to one or more UEs including a UE connected to the IAB node in response to determining that the IAB node has not recovered from the radio link failure.

These and other aspects of the invention will become more fully understood upon a review of the detailed description, which follows. Other aspects, features, and embodiments of the present invention will become apparent to those of ordinary skill in the art, upon reviewing the following description of specific, exemplary embodiments of the present invention in conjunction with the accompanying figures. While features of the present invention may be discussed relative to certain embodiments and figures below, all embodiments of the present invention can include one or more of the advantageous features discussed herein. In other words, while one or more embodiments may be discussed as having certain advantageous features, one or more of such features may also be used in accordance with the various embodiments of the invention discussed herein. In similar fashion, while exemplary embodiments may be discussed below as device, system, or method embodiments it should be understood that such exemplary embodiments can be implemented in various devices, systems, and methods.

DETAILED DESCRIPTION

Figure 1:
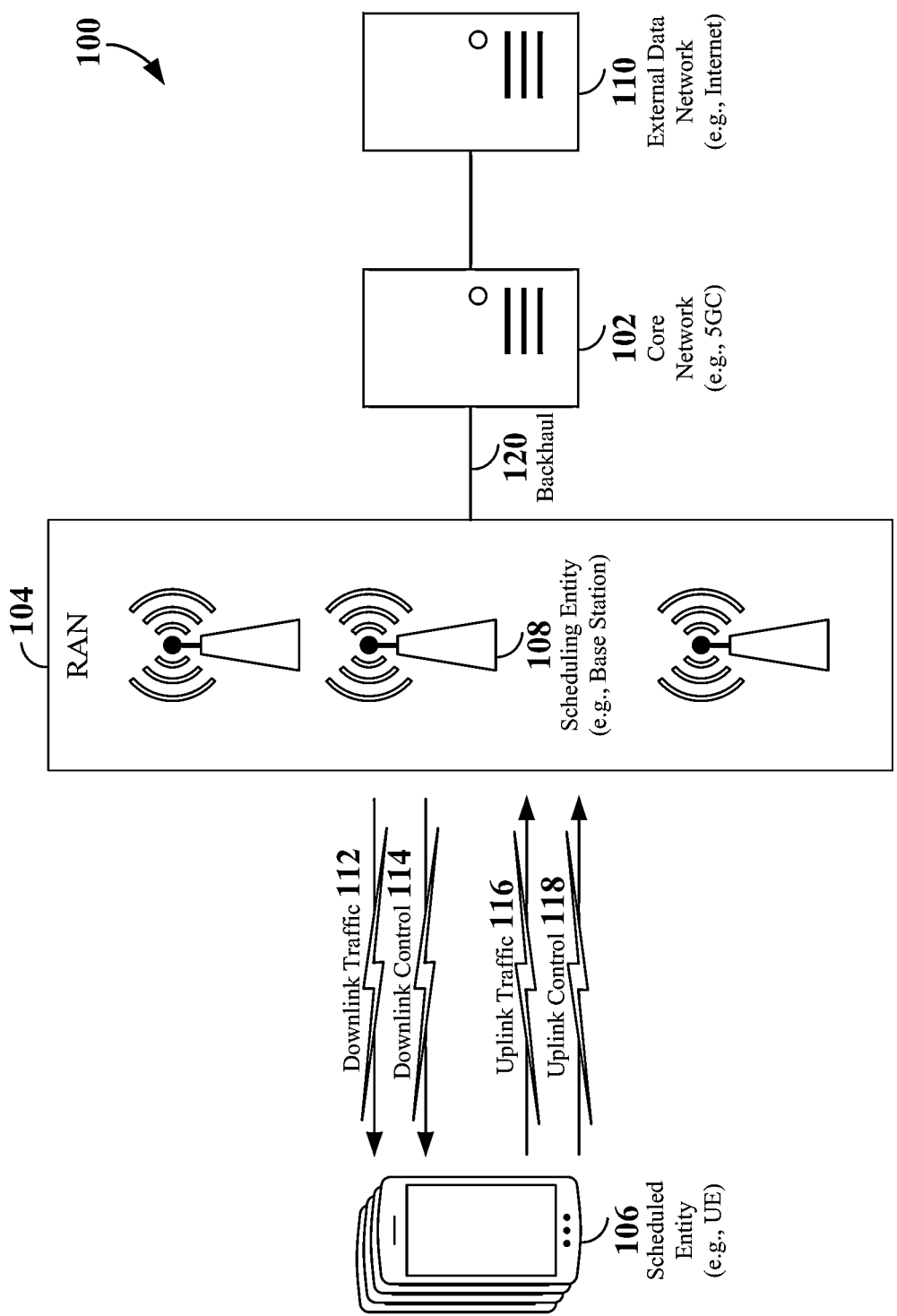
FIG. 1 is a schematic illustration of a wireless communication system according to some aspects.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

While aspects and embodiments are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, embodiments and/or uses may come about via integrated chip embodiments and other non-module-component based devices (e.g., end-user devices, vehicles, communication devices, computing devices, industrial equipment, retail/purchasing devices, medical devices, AI-enabled devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or original equipment manufacturer (OEM) devices or systems incorporating one or more aspects of the described innovations. In some practical settings, devices incorporating described aspects and features may also necessarily include additional components and features for implementation and practice of claimed and described embodiments. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, end-user devices, etc. of varying sizes, shapes and constitution.

An integrated access backhaul (IAB) network may be deployed where an IAB donor is connected to a core network and may be wirelessly connected to a UE or one or more IAB nodes that can act as relays to communication to a UE. Hence, a communication chain may exist between the IAB donor and a UE, where the UE may communicate with the core network via an IAB node and the IAB donor connected to the core network. The IAB node connected to the UE may experience a radio link failure (RLF) in a communication between the IAB node and the IAB donor, either directly or indirectly via another IAB node. The RLF may be explicitly indicated between IAB nodes and the IAB donor in the IAB network. However, there is no mechanism to indicate the RLF experienced by an IAB node to the UE connected to the IAB node.

According to some aspects, after an IAB node detects an RLF in a communication between the IAB node and an IAB donor, the IAB node may perform one or more features to handle communication affected by the RLF. In an aspect, when the RLF is detected, the IAB node may stop broadcasting synchronization signal blocks (SSBs) to one or more UEs including a UE connected to the IAB. For example, the IAB node may stop broadcasting the SSBs to the one or more UEs if the IAB node cannot recover from the RLF within a certain time limit, or may stop broadcasting the SSBs to the one or more UEs immediately when the RLF is detected. As such, without the SSBs from the IAB node, the UE may determine to select or reselect to another cell with a different base station or a different IAB node other than the IAB node. In an aspect, the IAB node may reconfigure the UE to reduce a maximum number of re-transmissions and/or a maximum number of RACH attempts by the UE, to cause the UE to determine the RLF more quickly. In an aspect, the IAB node may reconfigure the UE to reduce the UE transmit power, such that the UE may conserve the transmit power during the RLF.

The various concepts presented throughout this disclosure may be implemented across a broad variety of telecommunication systems, network architectures, and communication standards. Referring now to FIG. 1, as an illustrative example without limitation, various aspects of the present disclosure are illustrated with reference to a wireless communication system 100. The wireless communication system 100 includes three interacting domains: a core network 102, a radio access network (RAN) 104, and a user equipment (UE) 106. By virtue of the wireless communication system 100, the UE 106 may be enabled to carry out data communication with an external data network 110, such as (but not limited to) the Internet.

The RAN 104 may implement any suitable radio access technology (RAT) or RATs to provide radio access to the UE 106. As one example, the RAN 104 may operate according to 3rd Generation Partnership Project (3GPP) New Radio (NR) specifications, often referred to as 5G. As another example, the RAN 104 may operate under a hybrid of 5G NR and Evolved Universal Terrestrial Radio Access Network (eUTRAN) standards, often referred to as LTE. The 3GPP refers to this hybrid RAN as a next-generation RAN, or NG-RAN. In another example, the RAN 104 may operate according to both the LTE and 5G NR standards. Of course, many other examples may be utilized within the scope of the present disclosure.

As illustrated, the RAN 104 includes a plurality of base stations 108. Broadly, a base station is a network element in a radio access network responsible for radio transmission and reception in one or more cells to or from a UE. In different technologies, standards, or contexts, a base station may variously be referred to by those skilled in the art as a base transceiver station (BTS), a radio base station, a radio transceiver, a transceiver function, a basic service set (BSS), an extended service set (ESS), an access point (AP), a Node B (NB), an eNode B (eNB), a gNode B (gNB), or some other suitable terminology. In examples where the RAN 104 operates according to both the LTE and 5G NR standards, one of the base stations 108 may be an LTE base station, while another base station may be a 5G NR base station.

The radio access network 104 is further illustrated supporting wireless communication for multiple mobile apparatuses. A mobile apparatus may be referred to as user equipment (UE) 106 in 3GPP standards, but may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. A UE 106 may be an apparatus that provides a user with access to network services. In examples where the RAN 104 operates according to both the LTE and 5G NR standards, the UE 106 may be an Evolved-Universal Terrestrial Radio Access Network-New Radio dual connectivity (EN-DC) UE that is capable of simultaneously connecting to an LTE base station and a NR base station to receive data packets from both the LTE base station and the NR base station.

Within the present document, a "mobile" apparatus need not necessarily have a capability to move, and may be stationary. The term mobile apparatus or mobile device broadly refers to a diverse array of devices and technologies. UEs may include a number of hardware structural components sized, shaped, and arranged to help in communication; such components can include antennas, antenna arrays, RF chains, amplifiers, one or more processors, etc. electrically coupled to each other. For example, some non-limiting examples of a mobile apparatus include a mobile, a cellular (cell) phone, a smart phone, a session initiation protocol (SIP) phone, a laptop, a personal computer (PC), a notebook, a netbook, a smartbook, a tablet, a personal digital assistant (PDA), and a broad array of embedded systems, e.g., corresponding to an "Internet of Things". A mobile apparatus may additionally be an automotive or other transportation vehicle, a remote sensor or actuator, a robot or robotics device, a satellite radio, a global positioning system (GPS) device, a remote control device, a consumer and/or wearable device, such as eyewear, a wearable camera, a virtual reality device, a smart watch, a health or fitness tracker, a digital audio player (e.g., MP3 player), a camera, a game console, etc. A mobile apparatus may additionally be a digital home or smart home device such as a home audio, video, and/or multimedia device, an appliance, a vending machine, intelligent lighting, a home security system, a smart meter, etc. A mobile apparatus may additionally be a smart energy device, a security device, a solar panel or solar array, a municipal infrastructure device controlling electric power (e.g., a smart grid), lighting, water, etc.; an industrial automation and enterprise device; a logistics controller; agricultural equipment; vehicles, etc. Still further, a mobile apparatus may provide for connected medicine or telemedicine support, i.e., health care at a distance. Telehealth devices may include telehealth monitoring devices and telehealth administration devices, whose communication may be given preferential treatment or prioritized access over other types of information, e.g., in terms of prioritized access for transport of critical service data, and/or relevant QoS for transport of critical service data.

Wireless communication between a RAN 104 and a UE 106 may be described as utilizing an air interface. Transmissions over the air interface from a base station (e.g., base station 108) to one or more UEs (e.g., UE 106) may be referred to as downlink (DL) transmission. In accordance with certain aspects of the present disclosure, the term downlink may refer to a point-to-multipoint transmission originating at a scheduling entity (described further below; e.g., base station 108). Another way to describe this scheme may be to use the term broadcast channel multiplexing. Transmissions from a UE (e.g., UE 106) to a base station (e.g., base station 108) may be referred to as uplink (UL) transmissions. In accordance with further aspects of the present disclosure, the term uplink may refer to a point-to-point transmission originating at a scheduled entity (described further below; e.g., UE 106).

In some examples, access to the air interface may be scheduled, wherein a scheduling entity (e.g., a base station 108) allocates resources for communication among some or all devices and equipment within its service area or cell. Within the present disclosure, as discussed further below, the scheduling entity may be responsible for scheduling, assigning, reconfiguring, and releasing resources for one or more scheduled entities. That is, for scheduled communication, UEs 106, which may be scheduled entities, may utilize resources allocated by the scheduling entity 108.

Base stations 108 are not the only entities that may function as scheduling entities. That is, in some examples, a UE may function as a scheduling entity, scheduling resources for one or more scheduled entities (e.g., one or more other UEs).

As illustrated in FIG. 1, a scheduling entity 108 may broadcast downlink traffic 112 to one or more scheduled entities 106. Broadly, the scheduling entity 108 is a node or device responsible for scheduling traffic in a wireless communication network, including the downlink traffic 112 and, in some examples, uplink traffic 116 from one or more scheduled entities 106 to the scheduling entity 108. On the other hand, the scheduled entity 106 is a node or device that receives downlink control information 114, including but not limited to scheduling information (e.g., a grant), synchronization or timing information, or other control information from another entity in the wireless communication network such as the scheduling entity 108.

In addition, the uplink and/or downlink control information and/or traffic information may be time-divided into frames, subframes, slots, and/or symbols. As used herein, a symbol may refer to a unit of time that, in an orthogonal frequency division multiplexed (OFDM) waveform, carries one resource element (RE) per sub-carrier. A slot may carry 7 or 14 OFDM symbols. A subframe may refer to a duration of 1 ms. Multiple subframes or slots may be grouped together to form a single frame or radio frame. Of course, these definitions are not required, and any suitable scheme for organizing waveforms may be utilized, and various time divisions of the waveform may have any suitable duration.

In general, base stations 108 may include a backhaul interface for communication with a backhaul portion 120 of the wireless communication system. The backhaul 120 may provide a link between a base station 108 and the core network 102. Further, in some examples, a backhaul network may provide interconnection between the respective base stations 108. Various types of backhaul interfaces may be employed, such as a direct physical connection, a virtual network, or the like using any suitable transport network.

The core network 102 may be a part of the wireless communication system 100, and may be independent of the radio access technology used in the RAN 104. In some examples, the core network 102 may be configured according to 5G standards (e.g., 5 GC). In other examples, the core network 102 may be configured according to a 4G evolved packet core (EPC), or any other suitable standard or configuration.

Figure 2:
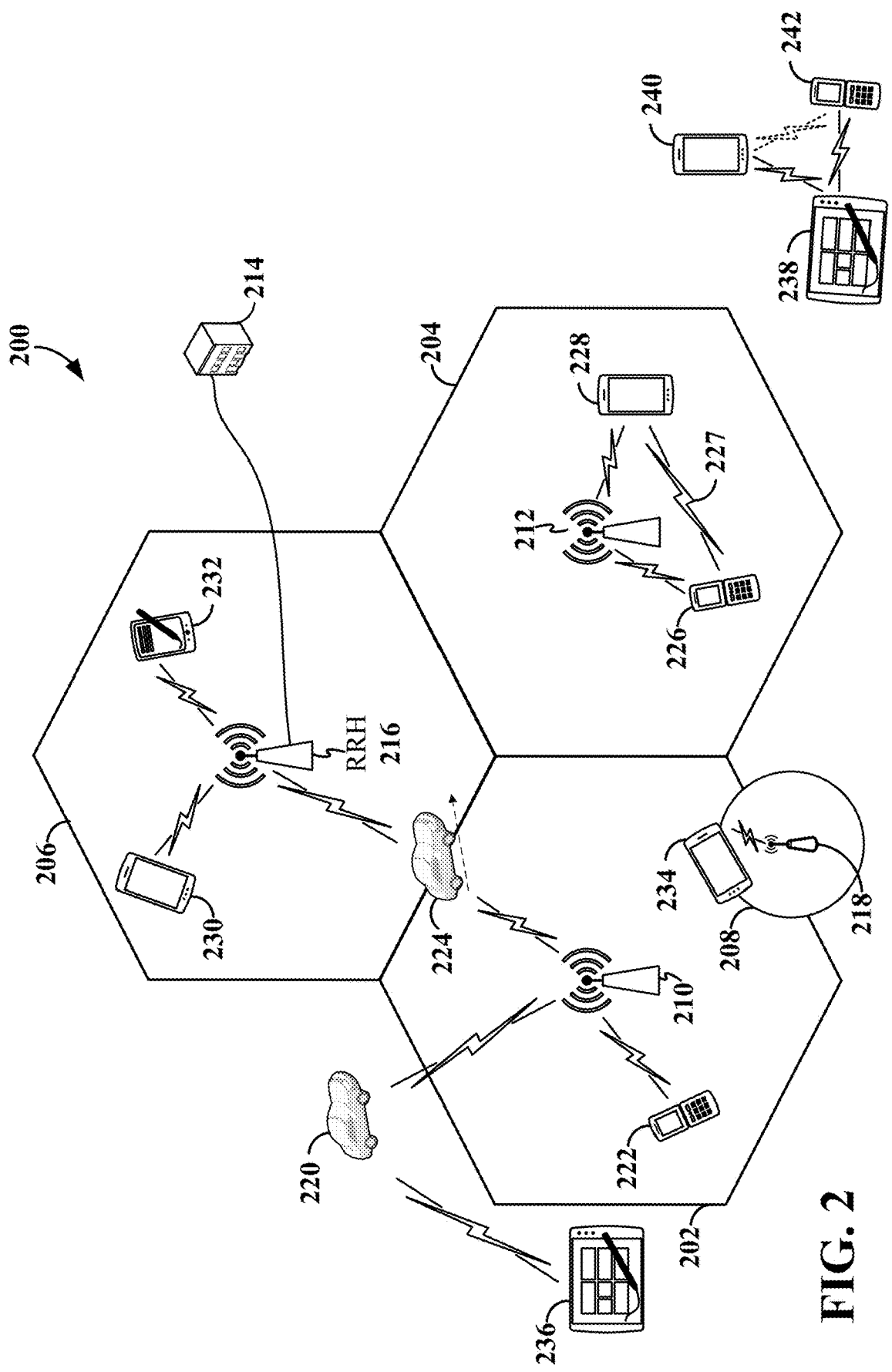
FIG. 2 is a conceptual illustration of an example of a radio access network according to some aspects.

Referring now to FIG. 2, by way of example and without limitation, a schematic illustration of a RAN 200 is provided. In some examples, the RAN 200 may be the same as the RAN 104 described above and illustrated in FIG. 1. The geographic area covered by the RAN 200 may be divided into cellular regions (cells) that can be uniquely identified by a user equipment (UE) based on an identification broadcasted from one access point or base station. FIG. 2 illustrates macrocells 202, 204, and 206, and a small cell 208, each of which may include one or more sectors (not shown). A sector is a sub-area of a cell. All sectors within one cell are served by the same base station. A radio link within a sector can be identified by a single logical identification belonging to that sector. In a cell that is divided into sectors, the multiple sectors within a cell can be formed by groups of antennas with each antenna responsible for communication with UEs in a portion of the cell.

In FIG. 2, two base stations 210 and 212 are shown in cells 202 and 204; and a third base station 214 is shown controlling a remote radio head (RRH) 216 in cell 206. That is, a base station can have an integrated antenna or can be connected to an antenna or RRH by feeder cables. In the illustrated example, the cells 202, 204, and 126 may be referred to as macrocells, as the base stations 210, 212, and 214 support cells having a large size. Further, a base station 218 is shown in the small cell 208 (e.g., a microcell, picocell, femtocell, home base station, home Node B, home eNode B, etc.) which may overlap with one or more macrocells. In this example, the cell 208 may be referred to as a small cell, as the base station 218 supports a cell having a relatively small size. Cell sizing can be done according to system design as well as component constraints.

It is to be understood that the radio access network 200 may include any number of wireless base stations and cells.

Further, a relay node may be deployed to extend the size or coverage area of a given cell. The base stations 210, 212, 214, 218 provide wireless access points to a core network for any number of mobile apparatuses. In some examples, the base stations 210, 212, 214, and/or 218 may be the same as the base station/scheduling entity 108 described above and illustrated in FIG. 1.

Within the RAN 200, the cells may include UEs that may be in communication with one or more sectors of each cell. Further, each base station 210, 212, 214, and 218 may be configured to provide an access point to a core network 102 (see FIG. 1) for all the UEs in the respective cells. For example, UEs 222 and 224 may be in communication with base station 210; UEs 226 and 228 may be in communication with base station 212; UEs 230 and 232 may be in communication with base station 214 by way of RRH 216; and UE 234 may be in communication with base station 218. In some examples, the UEs 222, 224, 226, 228, 230, 232, 234, 238, 240, and/or 242 may be the same as the UE/scheduled entity 106 described above and illustrated in FIG. 1.

In some examples, a vehicle 220 can be a mobile network node and may be configured to function as a UE. For example, the vehicle 220 may operate within cell 202 by communicating with base station 210.

In the radio access network 200, the ability for a UE to communicate while moving, independent of its location, is referred to as mobility. The various physical channels between the UE and the radio access network are generally set up, maintained, and released under the control of an access and mobility management function (AMF, not illustrated, part of the core network 102 in FIG. 1), which may include a security context management function (SCMF) that manages the security context for both the control plane and the user plane functionality, and a security anchor function (SEAF) that performs authentication.

A radio access network 200 may utilize DL-based mobility or UL-based mobility to enable mobility and handovers (i.e., the transfer of a UE's connection from one radio channel to another). In a network configured for DL-based mobility, during a call with a scheduling entity, or at any other time, a UE may monitor various parameters of the signal from its serving cell as well as various parameters of neighboring cells. Depending on the quality of these parameters, the UE may maintain communication with one or more of the neighboring cells. During this time, if the UE moves from one cell to another, or if signal quality from a neighboring cell exceeds that from the serving cell for a given amount of time, the UE may undertake a handoff or handover from the serving cell to the neighboring (target) cell. For example, UE 224 (illustrated as a vehicle, although any suitable form of UE may be used) may move from the geographic area corresponding to its serving cell 202 to the geographic area corresponding to a neighbor cell 206. When the signal strength or quality from the neighbor cell 206 exceeds that of its serving cell 202 for a given amount of time, the UE 224 may transmit a reporting message to its serving base station 210 indicating this condition. In response, the UE 224 may receive a handover command, and the UE may undergo a handover to the cell 206.

In a network configured for UL-based mobility, UL reference signals from each UE may be utilized by the network to select a serving cell for each UE. In some examples, the base stations 210, 212, and 214/216 may broadcast unified synchronization signals (e.g., unified Primary Synchronization Signals (PSSs), unified Secondary Synchronization Signals (SSSs) and unified Physical Broadcast Channels (PBCH)). The UEs 222, 224, 226, 228, 230, and 232 may receive the unified synchronization signals, derive the carrier frequency and slot timing from the synchronization signals, and in response to deriving timing, transmit an uplink pilot or reference signal. The uplink pilot signal transmitted by a UE (e.g., UE 224) may be concurrently received by two or more cells (e.g., base stations 210 and 214/216) within the radio access network 200. Each of the cells may measure a strength of the pilot signal, and the radio access network (e.g., one or more of the base stations 210 and 214/216 and/or a central node within the core network) may determine a serving cell for the UE 224. As the UE 224 moves through the radio access network 200, the network may continue to monitor the uplink pilot signal transmitted by the UE 224. When the signal strength or quality of the pilot signal measured by a neighboring cell exceeds that of the signal strength or quality measured by the serving cell, the network 200 may handover the UE 224 from the serving cell to the neighboring cell, with or without informing the UE 224.

Although the synchronization signal transmitted by the base stations 210, 212, and 214/216 may be unified, the synchronization signal may not identify a particular cell, but rather may identify a zone of multiple cells operating on the same frequency and/or with the same timing. The use of zones in 5G networks or other next generation communication networks enables the uplink-based mobility framework and improves the efficiency of both the UE and the network, since the number of mobility messages that need to be exchanged between the UE and the network may be reduced.

In various implementations, the air interface in the radio access network 200 may utilize licensed spectrum, unlicensed spectrum, or shared spectrum. Licensed spectrum provides for exclusive use of a portion of the spectrum, generally by virtue of a mobile network operator purchasing a license from a government regulatory body. Unlicensed spectrum provides for shared use of a portion of the spectrum without need for a government-granted license. While compliance with some technical rules is generally still required to access unlicensed spectrum, generally, any operator or device may gain access. Shared spectrum may fall between licensed and unlicensed spectrum, wherein technical rules or limitations may be required to access the spectrum, but the spectrum may still be shared by multiple operators and/or multiple RATs. For example, the holder of a license for a portion of licensed spectrum may provide licensed shared access (LSA) to share that spectrum with other parties, e.g., with suitable licensee-determined conditions to gain access.

In some examples, access to the air interface may be scheduled, where a scheduling entity (e.g., a base station) allocates resources (e.g., time-frequency resources) for communication among some or all devices and equipment within its service area or cell. Within the present disclosure, as discussed further below, the scheduling entity may be responsible for scheduling, assigning, reconfiguring, and releasing resources for one or more scheduled entities. That is, for scheduled communication, UEs or scheduled entities utilize resources allocated by the scheduling entity.

Base stations are not the only entities that may function as a scheduling entity. That is, in some examples, a UE may function as a scheduling entity, scheduling resources for one or more scheduled entities (e.g., one or more other UEs). In this example, sidelink or other type of direct link signals may be communicated directly between UEs without necessarily relying on scheduling or control information from another entity. For example, UE 238 is illustrated communicating with UEs 240 and 242. In some examples, the UE 238 is functioning as a scheduling entity, while the UEs 240 and 242 may function as scheduled entities.

UEs 238, 240, and 242 may communicate over a direct link in a device-to-device (D2D), peer-to-peer (P2P), vehicle-to-everything (V2X), and/or in a mesh network. In a mesh network example, UEs 240 and 242 may optionally communicate directly with one another in addition to communicating with a scheduling entity (e.g., UE 238). In some examples, UE 238 may be a transmitting sidelink device that reserves resources on a sidelink carrier for the transmission of sidelink signals to UEs 240 and 242 in a D2D or V2X network. Here, UEs 240 and 242 are each receiving sidelink devices. UEs 240 and 242 may, in turn, reserve additional resources on the sidelink carrier for subsequent sidelink transmissions.

In some examples, two or more UEs (e.g., UEs 226 and 228) within the coverage area of a serving base station 212 may communicate with both the base station 212 using cellular signals and with each other using sidelink signals 227 without relaying that communication through the base station. In this example, the base station 212 or one or both of the UEs 226 and 228 may function as scheduling entities to schedule sidelink communication between UEs 226 and 228. For example, UEs 226 and 228 may communicate sidelink signals 227 within a vehicle-to-everything (V2X) network.

The air interface in the radio access network 200 may utilize one or more duplexing algorithms. Duplex refers to a point-to-point communication link where both endpoints can communicate with one another in both directions. Full duplex means both endpoints can simultaneously communicate with one another. Half duplex means only one endpoint can send information to the other at a time. In a wireless link, a full duplex channel generally relies on physical isolation of a transmitter and receiver, and suitable interference cancellation technologies. Full duplex emulation is frequently implemented for wireless links by utilizing frequency division duplex (FDD) or time division duplex (TDD). In FDD, transmissions in different directions operate at different carrier frequencies. In TDD, transmissions in different directions on a given channel are separated from one another using time division multiplexing. That is, at some times the channel is dedicated for transmissions in one direction, while at other times the channel is dedicated for transmissions in the other direction, where the direction may change very rapidly, e.g., several times per slot.

The air interface in the radio access network 200 may further utilize one or more multiplexing and multiple access algorithms to enable simultaneous communication of the various devices. For example, 5G NR specifications provide multiple access for UL transmissions from UEs 222 and 224 to base station 210, and for multiplexing for DL transmissions from base station 210 to one or more UEs 222 and 224, utilizing orthogonal frequency division multiplexing (OFDM) with a cyclic prefix (CP). In addition, for UL transmissions, 5G NR specifications provide support for discrete Fourier transform-spread-OFDM (DFT-s-OFDM) with a CP (also referred to as single-carrier FDMA (SC-FDMA)). However, within the scope of the present disclosure, multiplexing and multiple access are not limited to the above schemes, and may be provided utilizing time division multiple access (TDMA), code division multiple access (CDMA), frequency division multiple access (FDMA), sparse code multiple access (SCMA), resource spread multiple access (RSMA), or other suitable multiple access schemes. Further, multiplexing DL transmissions from the base station 210 to UEs 222 and 224 may be provided utilizing time division multiplexing (TDM), code division multiplexing (CDM), frequency division multiplexing (FDM), orthogonal frequency division multiplexing (OFDM), sparse code multiplexing (SCM), or other suitable multiplexing schemes.

Figure 3:
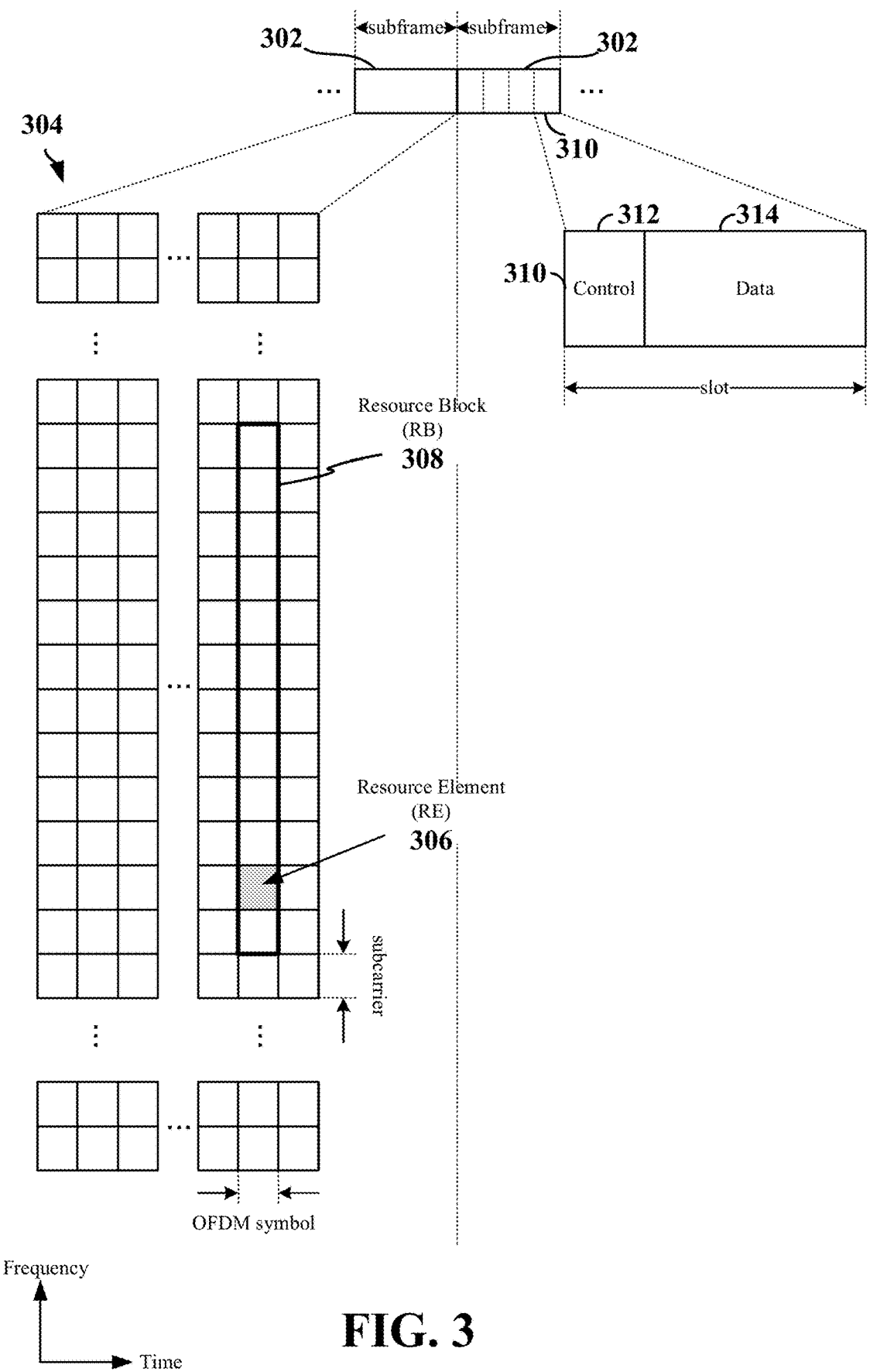
FIG. 3 is a schematic diagram illustrating organization of wireless resources in an air interface utilizing orthogonal frequency divisional multiplexing (OFDM) according to some aspects.

Various aspects of the present disclosure will be described with reference to an OFDM waveform, an example of which is schematically illustrated in FIG. 3. It should be understood by those of ordinary skill in the art that the various aspects of the present disclosure may be applied to an SC-FDMA waveform in substantially the same way as described herein below. That is, while some examples of the present disclosure may focus on an OFDM link for clarity, it should be understood that the same principles may be applied as well to SC-FDMA waveforms.

Referring now to FIG. 3, an expanded view of an exemplary DL subframe 302 is illustrated, showing an OFDM resource grid. However, as those skilled in the art will readily appreciate, the PHY transmission structure for any particular application may vary from the example described here, depending on any number of factors. Here, time is in the horizontal direction with units of OFDM symbols; and frequency is in the vertical direction with units of subcarriers.

The resource grid 304 may be used to schematically represent time-frequency resources for a given antenna port. That is, in a multiple-input-multiple-output (MIMO) implementation with multiple antenna ports available, a corresponding multiple number of resource grids 304 may be available for communication. The resource grid 304 is divided into multiple resource elements (REs) 306. An RE, which is 1 subcarrier×1 symbol, is the smallest discrete part of the time-frequency grid, and contains a single complex quantity representing data from a physical channel or signal. Depending on the modulation utilized in a particular implementation, each RE may represent one or more bits of information. In some examples, a block of REs may be referred to as a physical resource block (PRB) or more simply a resource block (RB) 308, which contains any suitable number of consecutive subcarriers in the frequency domain. In one example, an RB may include 12 subcarriers, a number independent of the numerology used. In some examples, depending on the numerology, an RB may include any suitable number of consecutive OFDM symbols in the time domain Within the present disclosure, it is assumed that a single RB such as the RB 308 entirely corresponds to a single direction of communication (either transmission or reception for a given device).

A UE generally utilizes only a subset of the resource grid 304. An RB may be the smallest unit of resources that can be allocated to a UE. Thus, the more RBs scheduled for a UE, and the higher the modulation scheme chosen for the air interface, the higher the data rate for the UE.

In this illustration, the RB 308 is shown as occupying less than the entire bandwidth of the subframe 302, with some subcarriers illustrated above and below the RB 308. In a given implementation, the subframe 302 may have a bandwidth corresponding to any number of one or more RBs 308. Further, in this illustration, the RB 308 is shown as occupying less than the entire duration of the subframe 302, although this is merely one possible example.

Each 1 millisecond (ms) subframe 302 may consist of one or multiple adjacent slots. In the example shown in FIG. 4, one subframe 302 includes four slots 310, as an illustrative example. In some examples, a slot may be defined according to a specified number of OFDM symbols with a given cyclic prefix (CP) length. For example, a slot may include 7 or 14

OFDM symbols with a nominal CP. Additional examples may include mini-slots having a shorter duration (e.g., one or two OFDM symbols). These mini-slots may in some cases be transmitted occupying resources scheduled for ongoing slot transmissions for the same or for different UEs.

An expanded view of one of the slots 310 illustrates the slot 310 including a control region 312 and a data region 314. In general, the control region 312 may carry control channels (e.g., PDCCH), and the data region 314 may carry data channels (e.g., PDSCH or PUSCH). Of course, a slot may contain all DL, all UL, or at least one DL portion and at least one UL portion. The simple structure illustrated in FIG. 3 is merely exemplary in nature, and different slot structures may be utilized, and may include one or more of each of the control region(s) and data region(s).

Although not illustrated in FIG. 3, the various REs 306 within a RB 308 may be scheduled to carry one or more physical channels, including control channels, shared channels, data channels, etc. Other REs 306 within the RB 308 may also carry pilots or reference signals, including but not limited to a demodulation reference signal (DMRS) or a sounding reference signal (SRS). These pilots or reference signals may provide for a receiving device to perform channel estimation of the corresponding channel, which may enable coherent demodulation/detection of the control and/or data channels within the RB 308.

In a DL transmission, the transmitting device (e.g., the scheduling entity) may allocate one or more REs 306 (e.g., within a control region 312) to carry DL control information including one or more DL control channels, such as a PBCH; a physical control format indicator channel (PCFICH); a physical hybrid automatic repeat request (HARQ) indicator channel (PHICH); and/or a physical downlink control channel (PDCCH), etc., to one or more scheduled entities. The transmitting device may further allocate one or more REs 306 to carry other DL signals, such as a DMRS; a phase-tracking reference signal (PT-RS); a channel state information-reference signal (CSI-RS); a primary synchronization signal (PSS); and a secondary synchronization signal (SSS).

The synchronization signals PSS and SSS, and in some examples, the PBCH and a PBCH DMRS, may be transmitted in a synchronization signal block (SSB) that includes 4 consecutive OFDM symbols, numbered via a time index in increasing order from 0 to 3. In the frequency domain, the SSB may extend over 240 contiguous subcarriers, with the subcarriers being numbered via a frequency index in increasing order from 0 to 239. Of course, the present disclosure is not limited to this specific SSB configuration. Other nonlimiting examples may utilize greater or fewer than two synchronization signals; may include one or more supplemental channels in addition to the PBCH; may omit a PBCH; and/or may utilize a different number of symbols and/or nonconsecutive symbols for an SSB, within the scope of the present disclosure.

The PBCH may further include a master information block (MIB) that includes various system information, along with parameters for decoding a system information block (SIB). The SIB may be, for example, a SystemInformation-Type1 (SIB1) that may include various additional system information. Examples of system information may include, but are not limited to, subcarrier spacing, system frame number, cell bar indication, a list of common control resource sets (CoreSets) (e.g., PDCCH CoreSet0 or CoreSet1), a list of common search spaces, a search space for SIB1, a paging search space, a random access search space, and uplink configuration information.

The PCFICH provides information to assist a receiving device in receiving and decoding the PDCCH. The PDCCH carries downlink control information (DCI) including but not limited to power control commands, scheduling information, a grant, and/or an assignment of REs for DL and UL transmissions. The PHICH carries HARQ feedback transmissions such as an acknowledgment (ACK) or negative acknowledgment (NACK). HARQ is a technique well-known to those of ordinary skill in the art, wherein the integrity of packet transmissions may be checked at the receiving side for accuracy, e.g., utilizing any suitable integrity checking mechanism, such as a checksum or a cyclic redundancy check (CRC). If the integrity of the transmission confirmed, an ACK may be transmitted, whereas if not confirmed, a NACK may be transmitted. In response to a NACK, the transmitting device may send a HARQ retransmission, which may implement chase combining, incremental redundancy, etc.

In an UL transmission, the transmitting device (e.g., the scheduled entity) may utilize one or more REs 306 to carry UL control information including one or more UL control channels, such as a physical uplink control channel (PUCCH) and/or a Random Access Channel (RACH). The RACH may be used, for example, in a random access procedure during initial access of the uplink UL control information may include a variety of packet types and categories, including pilots, reference signals, and information configured to enable or assist in decoding uplink data transmissions. For example, the UL control information may include a DMRS or SRS. In some examples, the control information may include a scheduling request (SR), i.e., request for the scheduling entity to schedule uplink transmissions. Here, in response to the SR transmitted on the control channel, the scheduling entity may transmit downlink control information that may schedule resources for uplink packet transmissions. UL control information may also include HARQ feedback, channel state feedback (CSF), or any other suitable UL control information.

In addition to control information, one or more REs 306 (e.g., within the data region 314) may be allocated for user data or traffic data. Such traffic may be carried on one or more traffic channels, such as, for a DL transmission, a PDSCH; or for an UL transmission, a physical uplink shared channel (PUSCH). In some examples, one or more REs 306 within the data region 314 may be configured to carry SIBs (e.g., SIB1), carrying system information that may enable access to a given cell.

These physical channels described above are generally multiplexed and mapped to transport channels for handling at the medium access control (MAC) layer. Transport channels carry blocks of information called transport blocks (TB). The transport block size (TBS), which may correspond to a number of bits of information, may be a controlled parameter, based on the modulation and coding scheme (MCS) and the number of RBs in a given transmission.

The channels or carriers described above with reference to FIGS. 1-3 are not necessarily all of the channels or carriers that may be utilized between a scheduling entity and scheduled entities, and those of ordinary skill in the art will recognize that other channels or carriers may be utilized in addition to those illustrated, such as other traffic, control, and feedback channels.

Figure 4:
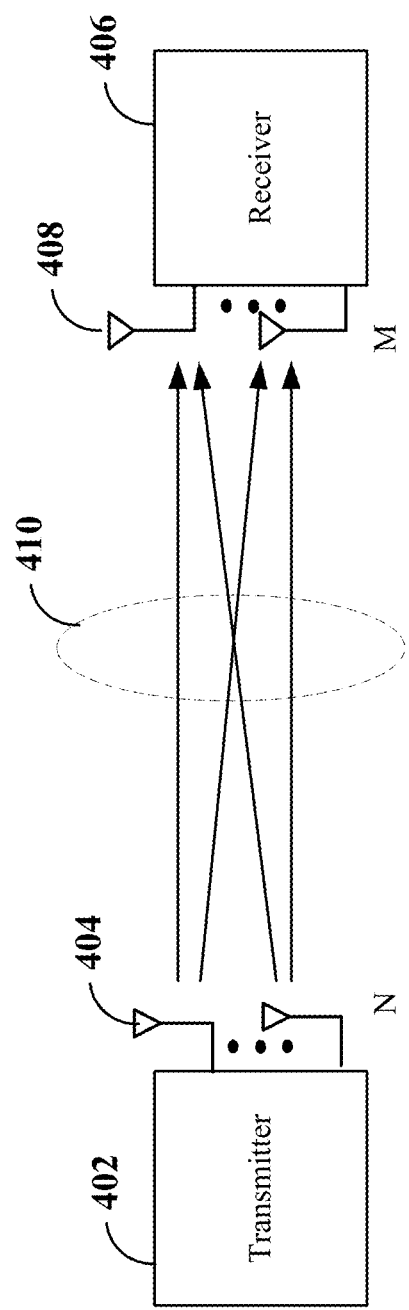
FIG. 4 is a block diagram illustrating a wireless communication system supporting beamforming and/or multiple-input multiple-output (MIMO) communication according to some aspects.

In some aspects of the disclosure, the scheduling entity and/or scheduled entity may be configured for beamforming and/or multiple-input multiple-output (MIMO) technology. FIG. 4 illustrates an example of a wireless communication system 400 supporting beamforming and/or MIMO. In a MIMO system, a transmitter 402 includes multiple transmit antennas 404 (e.g., N transmit antennas) and a receiver 406 includes multiple receive antennas 408 (e.g., M receive antennas). Thus, there are N×M signal paths 410 from the transmit antennas 404 to the receive antennas 408. Each of the transmitter 402 and the receiver 406 may be implemented, for example, within a scheduling entity, a scheduled entity, or any other suitable wireless communication device.

The use of such multiple antenna technology enables the wireless communication system to exploit the spatial domain to support spatial multiplexing, beamforming, and transmit diversity. Spatial multiplexing may be used to transmit different streams of data, also referred to as layers, simultaneously on the same time-frequency resource. The data streams may be transmitted to a single UE to increase the data rate or to multiple UEs to increase the overall system capacity, the latter being referred to as multi-user MIMO (MU-MIMO). This is achieved by spatially precoding each data stream (i.e., multiplying the data streams with different weighting and phase shifting) and then transmitting each spatially precoded stream through multiple transmit antennas on the downlink. The spatially precoded data streams arrive at the UE(s) with different spatial signatures, which enables each of the UE(s) to recover the one or more data streams destined for that UE. On the uplink, each UE transmits a spatially precoded data stream, which enables the base station to identify the source of each spatially precoded data stream.

The number of data streams or layers corresponds to the rank of the transmission. In general, the rank of the MIMO system is limited by the number of transmit or receive antennas 404 or 408, whichever is lower. In addition, the channel conditions at the UE, as well as other considerations, such as the available resources at the base station, may also affect the transmission rank. For example, the rank (and therefore, the number of data streams) assigned to a particular UE on the downlink may be determined based on the rank indicator (RI) transmitted from the UE to the base station. The RI may be determined based on the antenna configuration (e.g., the number of transmit and receive antennas) and a measured signal-to-interference-and-noise ratio (SINR) on each of the receive antennas. The RI may indicate, for example, the number of layers that may be supported under the current channel conditions. The base station may use the RI, along with resource information (e.g., the available resources and amount of data to be scheduled for the UE), to assign a transmission rank to the UE.

In one example, as shown in FIG. 4, a rank-2 spatial multiplexing transmission on a 2×2 MIMO antenna configuration will transmit one data stream from each transmit antenna 404. Each data stream reaches each receive antenna 408 along a different signal path 410. The receiver 406 may then reconstruct the data streams using the received signals from each receive antenna 408.

Beamforming is a signal processing technique that may be used at the transmitter 402 or receiver 406 to shape or steer an antenna beam (e.g., a transmit beam or receive beam) along a spatial path between the transmitter 402 and the receiver 406. Beamforming may be achieved by combining the signals communicated via antennas 404 or 408 (e.g., antenna elements of an antenna array module) such that some of the signals experience constructive interference while others experience destructive interference. To create the desired constructive/destructive interference, the transmitter 402 or receiver 406 may apply amplitude and/or phase offsets to signals transmitted or received from each of the antennas 404 or 408 associated with the transmitter 402 or receiver 406.

The radio protocol architecture for a radio access network, such as the radio access network 104 shown in FIG. 1 and/or the radio access network 200 shown in FIG. 2, may take on various forms depending on the particular application. An example of a radio protocol architecture for the user and control planes is illustrated FIG. 5.

Figure 5:
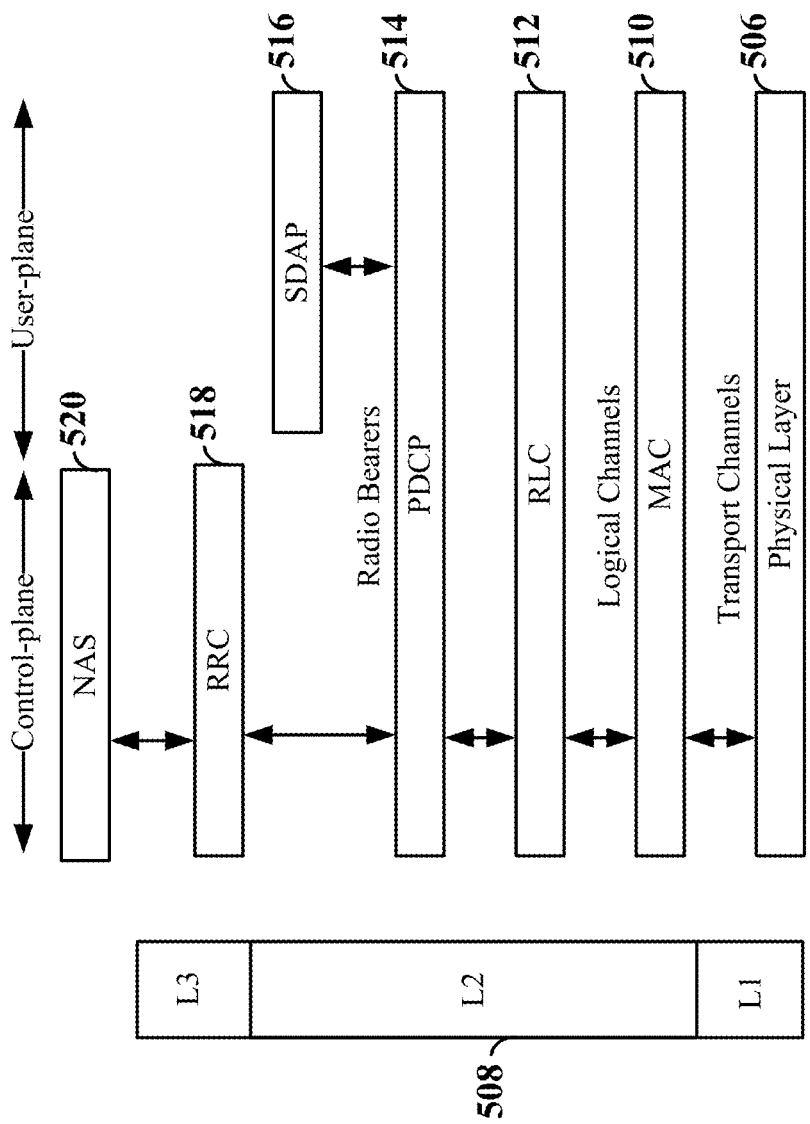
FIG. 5 is a diagram illustrating an example of a radio protocol architecture for the user and control plane according to some aspects.

As illustrated in FIG. 5, the radio protocol architecture for the UE and the base station includes three layers: layer 1 (L1), layer 2 (L2), and layer 5 (L8). L1 is the lowest layer and implements various physical layer signal processing functions. L1 will be referred to herein as the physical layer 506. L2 508 is above the physical layer 506 and is responsible for the link between the UE and base station over the physical layer 506.

In the user plane, the L2 layer 508 includes a media access control (MAC) layer 510, a radio link control (RLC) layer 512, a packet data convergence protocol (PDCP) 514 layer, and a service data adaptation protocol (SDAP) layer 516, which are terminated at the base station on the network side. Although not shown, the UE may have several upper layers above the L2 layer 508 including at least one network layer (e.g., IP layer and user data protocol (UDP) layer) that is terminated at the User Plane Function (UPF) on the network side and one or more application layers.

The SDAP layer 516 provides a mapping between a 5G core (5GC) quality of service (QoS) flow and a data radio bearer and performs QoS flow ID marking in both downlink and uplink packets. The PDCP layer 514 provides packet sequence numbering, in-order delivery of packets, retransmission of PDCP protocol data units (PDUs), and transfer of upper layer data packets to lower layers. PDU's may include, for example, Internet Protocol (IP) packets, Ethernet frames and other unstructured data (i.e., Machine-Type Communication (MTC), hereinafter collectively referred to as "packets"). The PDCP layer 514 also provides header compression for upper layer data packets to reduce radio transmission overhead, security by ciphering the data packets, and integrity protection of data packets. A PDCP context may indicate whether PDCP duplication is utilized for a unicast connection.

The RLC layer 512 provides segmentation and reassembly of upper layer data packets, error correction through automatic repeat request (ARQ), and sequence numbering independent of the PDCP sequence numbering. An RLC context may indicate whether an acknowledged mode (e.g., a reordering timer is used) or an unacknowledged mode is used for the RLC layer 512. The MAC layer 510 provides multiplexing between logical and transport channels. The MAC layer 510 is also responsible for allocating the various radio resources (e.g., resource blocks) in one cell among the UEs and for HARQ operations. A MAC context may enable, for example, a HARQ feedback scheme, resource selection algorithms, carrier aggregation, beam failure recovery, or other MAC parameters for a unicast connection. The physical layer 506 is responsible for transmitting and receiving data on physical channels (e.g., within slots). A PHY context may indicate a transmission format and a radio resource configuration (e.g., bandwidth part (BWP), numerology, etc.) for a unicast connection.

In the control plane, the radio protocol architecture for the UE and base station is substantially the same for L1 506 and L2 508 with the exception that there is no SDAP layer in the control plane and there is no header compression function for the control plane. The control plane also includes a radio resource control (RRC) layer 518 in L8 and a higher Non Access Stratum (NAS) layer 520. The RRC layer 518 is responsible for establishing and configuring signaling radio bearers (SRBs) and data radio bearers (DRBs) between the base station the UE, paging initiated by the 5GC or NG-RAN, and broadcast of system information related to Access Stratum (AS) and Non Access Stratum (NAS). The RRC layer 518 is further responsible for QoS management, mobility management (e.g., handover, cell selection, inter-RAT mobility), UE measurement and reporting, and security functions. The NAS layer 520 is terminated at the AMF in the core network and performs various functions, such as authentication, registration management, and connection management.

In 5G NR networks, a base station may be an aggregated base station, in which the radio protocol stack is logically integrated within a single RAN node, or a disaggregated base station, in which the radio protocol stack is logically split between a central unit (CU) and one or more distributed units (DUs). The CU hosts the radio resource control (RRC), service data adaptation protocol (SDAP), and packet data convergence protocol (PDCP) layers that control the operation of one or more DUs. The DU hosts the radio link control (RLC), medium access control (MAC) and physical (PHY) layers. The CU may be implemented within an edge RAN node, while the one or more DUs may be co-located with the CU and/or distributed throughout multiple RAN nodes that may be physically separated from one another. Disaggregated base stations may be utilized, for example, in integrated access backhaul (IAB) networks.

Figure 6:
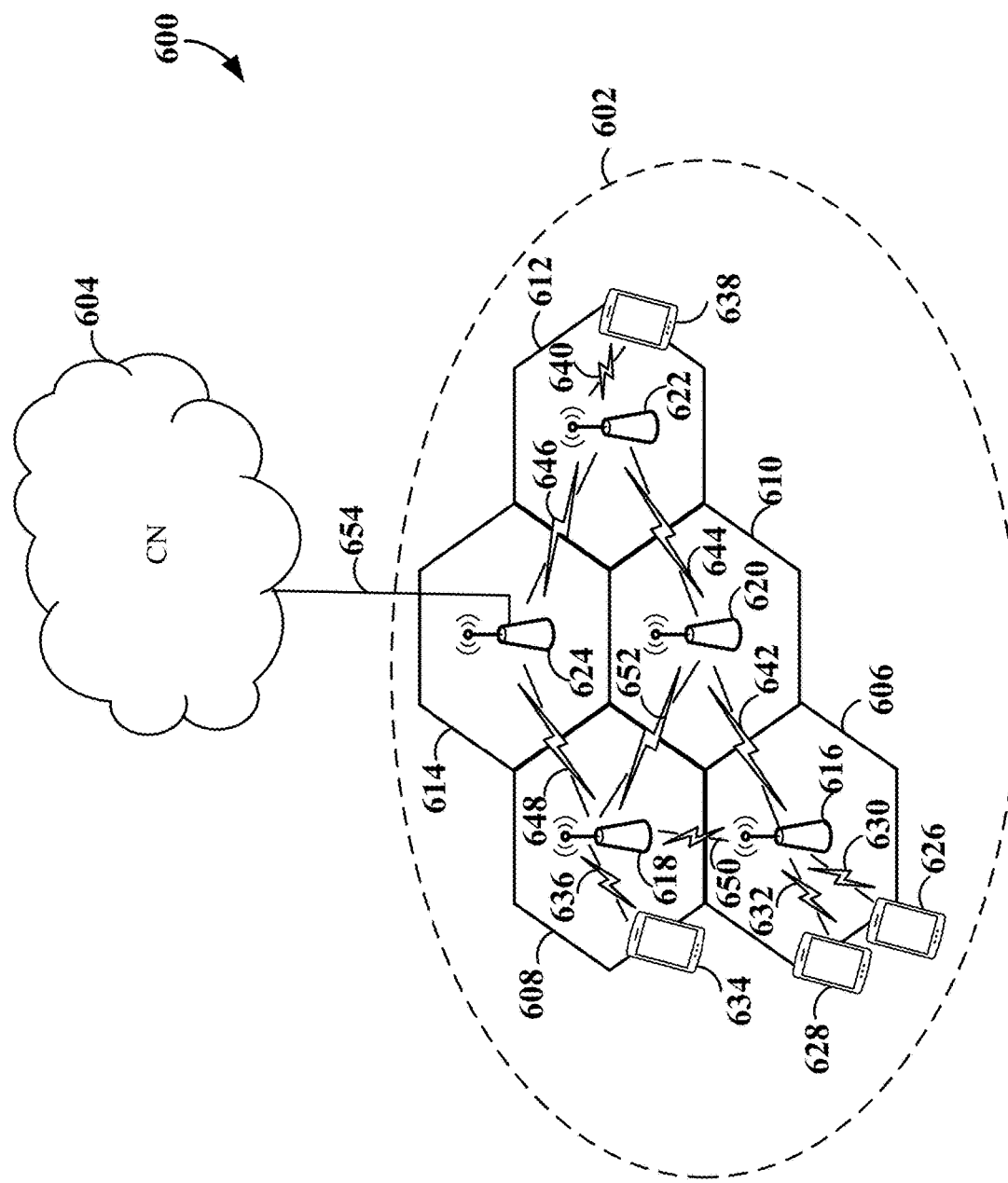
FIG. 6 is a schematic diagram providing a high-level illustration of one example of an IAB network configuration according to some aspects.

FIG. 6 is a schematic diagram providing a high-level illustration of one example of an IAB network configuration 600 according to some aspects. In this illustration, a communication network 602, such as an IAB network, is coupled to a remote network 604, such as a main backhaul network or mobile core network. In such an IAB network 602, the wireless spectrum may be used for both access links and backhaul links. In some examples, the wireless spectrum may utilize millimeter-wave (mmWave) or sub-6 GHz carrier frequencies.

The IAB network 602 may be similar to the radio access network 200 shown in FIG. 2, in that the IAB network 602 may be divided into a number cells 606, 608, 610, 612, and 614, each of which may be served by a respective IAB node 616, 618, 620, 622, and an IAB donor 624. Each of the IAB nodes 616-624 may be a base station (e.g., a gNB), or other node that utilizes wireless spectrum (e.g., the radio frequency (RF) spectrum) to support access for one or more UEs located within the cells 606-614 served by the IAB nodes.

In the example shown in FIG. 6, IAB node 616 communicates with UEs 626 and 628 via wireless access links 630 and 632, IAB node 618 communicates with UE 634 via wireless access link 636, and IAB node 622 communicates with UE 638 via wireless access link 640. The IAB nodes 616-622 and the IAB donor 624 are further interconnected via one or more wireless backhaul links 642, 644, 646, 648, 650, and 652. Each of the wireless backhaul links 642-652 may utilize the same wireless spectrum (e.g., the radio frequency (RF) spectrum) as the access links 630-640 to backhaul access traffic to/from the remote network 604. This may be referred to as wireless self-backhauling. Such wireless self-backhauling can enable fast and easy deployment of highly dense small cell networks. That is, rather than requiring each new gNB deployment to be outfitted with its own hard-wired backhaul connection, the wireless spectrum utilized for communication between the gNB and UE may be leveraged for backhaul communication between any numbers of IAB nodes to form the IAB network 602.

In the example shown in FIG. 6, IAB node 616 communicates with IAB node 620 via wireless backhaul link 642, IAB node 620 communicates with IAB node 622 via wireless backhaul link 644, IAB node 622 communicates with IAB donor 624 via wireless backhaul link 646, IAB donor 624 communicates with IAB node 618 via wireless backhaul link 648, IAB node 618 communicates with IAB node 616 via wireless backhaul link 650, and IAB node 618 communicates with IAB node 620 via wireless backhaul link 652. As shown in FIG. 6, each IAB node 616-624 may be connected via respective wireless backhaul links 642-652 to two or more other IAB nodes for robustness.

Some or all of the IAB nodes 616-622 and the IAB donor 624 may also be connected via wired backhaul links (e.g., fiber, coaxial cable, Ethernet, copper wires, etc.) and/or microwave backhaul links Thus, the IAB network 602 may support both wired/microwave and wireless backhaul traffic. The IAB donor 624 provides a communication link 654 to the remote network 604. For example, the IAB donor 624 may include a wired (e.g., fiber, coaxial cable, Ethernet, copper wires), microwave, or other suitable link (e.g., communication link 654) to the remote network 604.

To facilitate wireless communication between the IAB nodes 616-622 and between the IAB nodes 616-622 and the UEs served by the IAB nodes 616-622, each IAB node 616-622 may be configured to operate as both a scheduling entity and a scheduled entity. Thus, an IAB node (e.g., IAB node 616) may utilize the same wireless spectrum to transmit access traffic to/from UEs and to then backhaul that access traffic to/from the remote network 604. For example, to backhaul access traffic to/from IAB node 618, IAB node 618 may communicate with IAB node 620 to transmit backhaul access traffic via wireless backhaul link 642, IAB node 620 may communicate with IAB node 622 to transmit the backhaul access traffic via wireless backhaul link 644, and IAB node 622 may communicate with IAB donor 624 to transmit the backhaul access traffic via wireless backhaul link 646. In this example, IAB nodes 620 and 622 may each operate as both a scheduling entity and a scheduled entity to backhaul access traffic to/from IAB node 616. As such, communication between a pair of IAB nodes may be individually scheduled by one of the IAB nodes within the pair.

In other examples, an IAB node may schedule wireless backhaul communications between other pairs of IAB nodes. For example, IAB donor 624 may operate as the scheduling entity for the IAB network 602, while IAB nodes 616, 620, and 622 each operate as a scheduled entity to backhaul access traffic to/from IAB node 616. In this example, IAB donor 624 may schedule wireless backhaul communications between each of the pairs of IAB nodes (e.g., between IAB node 616 and IAB node 620, between IAB node 620 and IAB node 622, and between IAB node 622 and IAB donor 624). As another example, IAB node 622 may operate as a scheduling entity to schedule wireless backhaul communications between IAB nodes 616 and 620 and also between IAB node 620 and IAB node 622. IAB node 622 may then operate as a scheduled entity to allow IAB donor 624 to schedule wireless backhaul communications therebetween.

Figure 7:
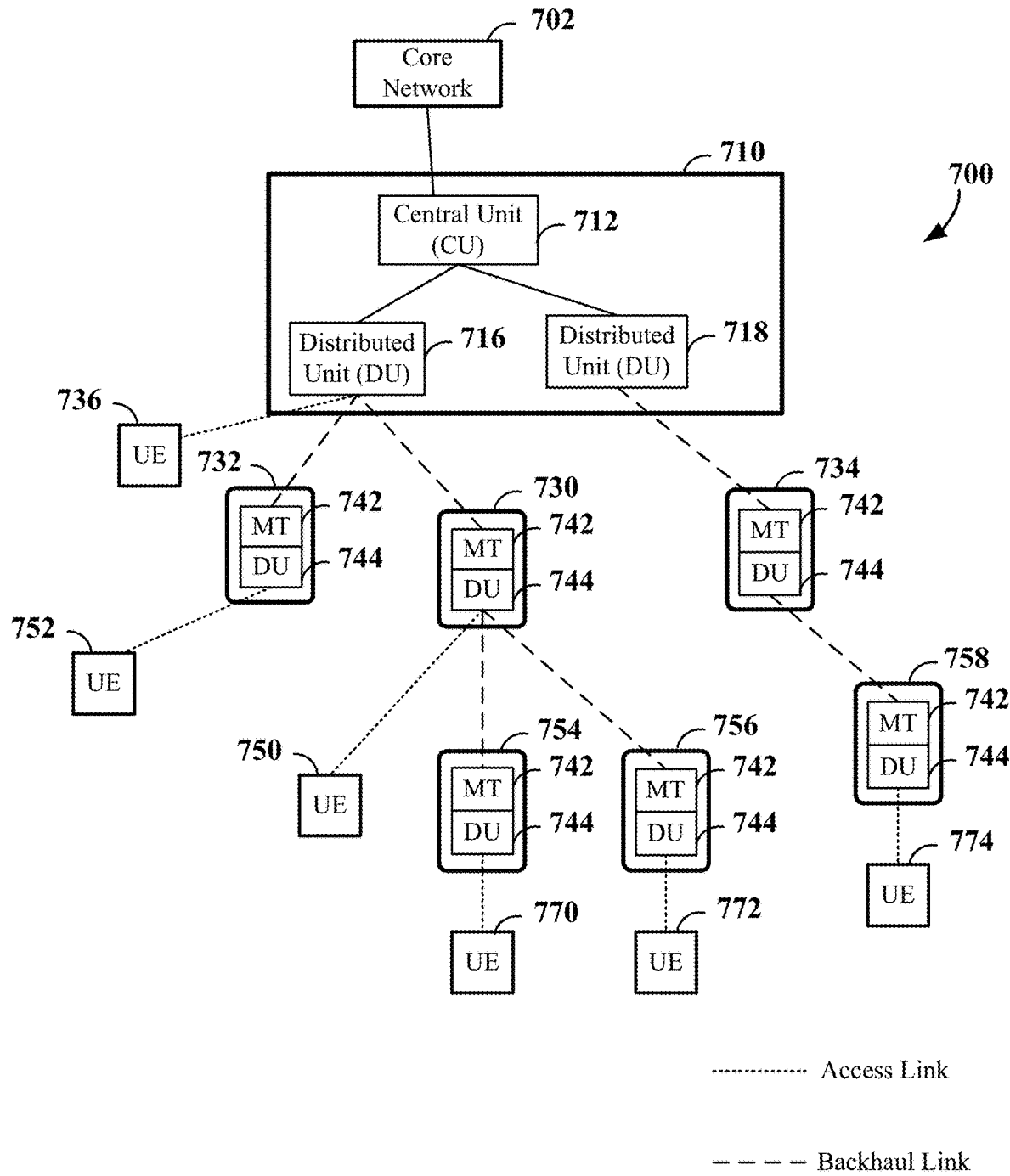
FIG. 7 is a schematic diagram illustrating an example of an integrated access backhaul (IAB) node functionality within an IAB network.

FIG. 7 is a schematic diagram illustrating an example of IAB node functionality within an IAB network 700. In the example shown in FIG. 7, an IAB donor 710 is shown coupled to a core network 702 via a wireline connection. This IAB donor 710 may be referred to herein as an IAB donor node, which may be, for example, an enhanced gNB including functionality for controlling the IAB network 700. In some examples, the IAB donor 710 may include a central unit (CU) 712 and one or more distributed unit (DUs) such as a DU 716 and a DU 718. The CU 712 is configured to operate as a centralized network node (or central entity) within the IAB network 700. For example, the CU 712 may include radio resource control (RRC) layer functionality and packet data convergence protocol (PDCP) layer functionality to control/configure the other nodes (e.g., IAB nodes and UEs) within the IAB network 700. Thus, the CU 712 can be configured to implement centralized mechanisms for handover decisions, topology changes, routing, bearer mapping, UE security, and other suitable services. For example, the IAB donor 710 may terminate the gNB-CU functionality toward the IAB nodes and an N2/X interface toward the rest of the network. For example, the IAB donor 710 may also terminate RRC/PDCP of the mobile termination (MT) functionality of the IAB node as well as lower layers (e.g., donor DU). In an aspect, a CU 712 of the IAB donor 710 may control a communication chain that may include one or more IAB nodes and a UE.

The DU 716 and the DU 744 are configured to operate as a scheduling entity to schedule scheduled entities (e.g., other IAB nodes and UEs) of the IAB donor 710. For example, the DU 716 of the IAB donor 710 may operate as a scheduling entity to schedule IAB nodes 730 and 732 and a UE 736. Thus, the DU 716 of the IAB donor 710 may schedule communication with IAB nodes 730 and 732 via respective backhaul links and schedule communication with the UE 736 via a respective access link. For example, the DU 718 of the IAB donor 710 may operate as a scheduling entity to schedule IAB node 734. Thus, the DU 716 of the IAB donor 710 may schedule communication with the IAB node 734 via a respective backhaul link. In some examples, the DU 716 and/or the DU 718 may include the radio link control (RLC), medium access control (MAC), and physical (PHY) layer functionality to enable operation as a scheduling entity.

Each of the IAB nodes 730, 732, and 734 may be configured as a Layer 2 (L2) relay node including a respective DU 744 and an MT unit 742 to enable each IAB node 730, 732, and 734 to operate as a scheduling entity and a scheduled entity. For example, the MT unit 742 within each of the IAB nodes 730, 732, and 734 is configured to operate as a scheduled entity that may be scheduled by the IAB donor 710. Each MT unit 742 within the IAB nodes 730, 732, and 734 further facilitates communication with the IAB donor 710 via respective backhaul links. In addition, the DU 744 within each of the IAB nodes 730, 732, and 734 operates similar to the DU 716 within the IAB donor 710 to function as a scheduling entity to schedule one or more respective scheduled entities (e.g., other IAB nodes and/or UEs).

For example, the DU 744 of IAB node 732 functions as a scheduling entity to schedule communication with a UE 752 via an access link. For example, the DU 744 of IAB node 730 functions as a scheduling entity to schedule communication with the MT units 742 of IAB nodes 754 and 756 via respective backhaul links and a UE 750 via an access link. For example, the DU 744 of IAB node 734 functions as a scheduling entity to schedule communication with the MT units 742 of IAB node 758 via a respective backhaul link Each of the IAB nodes 754, 756, and 758 further includes a respective DU 744 that may function as a scheduling entity to communicate with a respective UE of the UEs 770, 772, and 774.

For example, each IAB node may be configured to terminate the gNB-DU functionality toward the UEs (e.g., via a respective access link) and toward the CU 712. For example, each IAB node may support at least a subset of UE functionalities toward its parent node(s) and the core network 702 (e.g., as an MT functionality). For example, a parent node of an IAB node may be a node closer to a core network than the IAB node in a communication chain including the IAB node in an IAB network. Further, for example, a child node of an IAB node may be a node farther away from the core network than the IAB node in the communication chain including the IAB node in the IAB network.

As shown in FIG. 7, an IAB node may have a backhaul link via an MT unit of the IAB node in upstream (e.g., toward a core network) and may have a backhaul link via a DU of the IAB node (e.g., away from the core network). The backhaul link of the IAB node in upstream may be referred to as an upstream backhaul link, where the upstream backhaul link may be connected to a parent node of the IAB node. The backhaul link of the IAB node in downstream may be referred to as a downstream backhaul link, where the downstream backhaul link may be connected to a child node of the IAB node. For example, in FIG. 7, the backhaul link between the IAB node 730 and the IAB node 754 may be referred to as a downstream backhaul link of the IAB node 730 or an upstream backhaul link of the IAB node 754.

Further, as shown in FIG. 7, in the network topology illustrated in FIG. 7, the IAB donor 710, in combination with each of the IAB nodes 730, 732, 734, 754, 756, and 758, can collectively form a disaggregated base station. The disaggregated base station includes the CU 712 and each of the DUs 716, 718, and 744 controlled by the CU 712. The CU/DU functional split in disaggregated base stations can facilitate the realization of time-critical services, such as scheduling, retransmission, segmentation, and other similar services in the DU 716/718/744, while centralizing the less time-critical services in the CU 712. In addition, the CU/DU separation enables termination of external interfaces in the CU 712 instead of each DU, and further supports centralized termination of the PCDP to allow for dual connectivity and handover between the different DUs of the disaggregated base station. It should be understood that disaggregated base stations may be implemented within networks other than IAB networks, and the present disclosure is not limited to any particular type of network.

Figure 8:
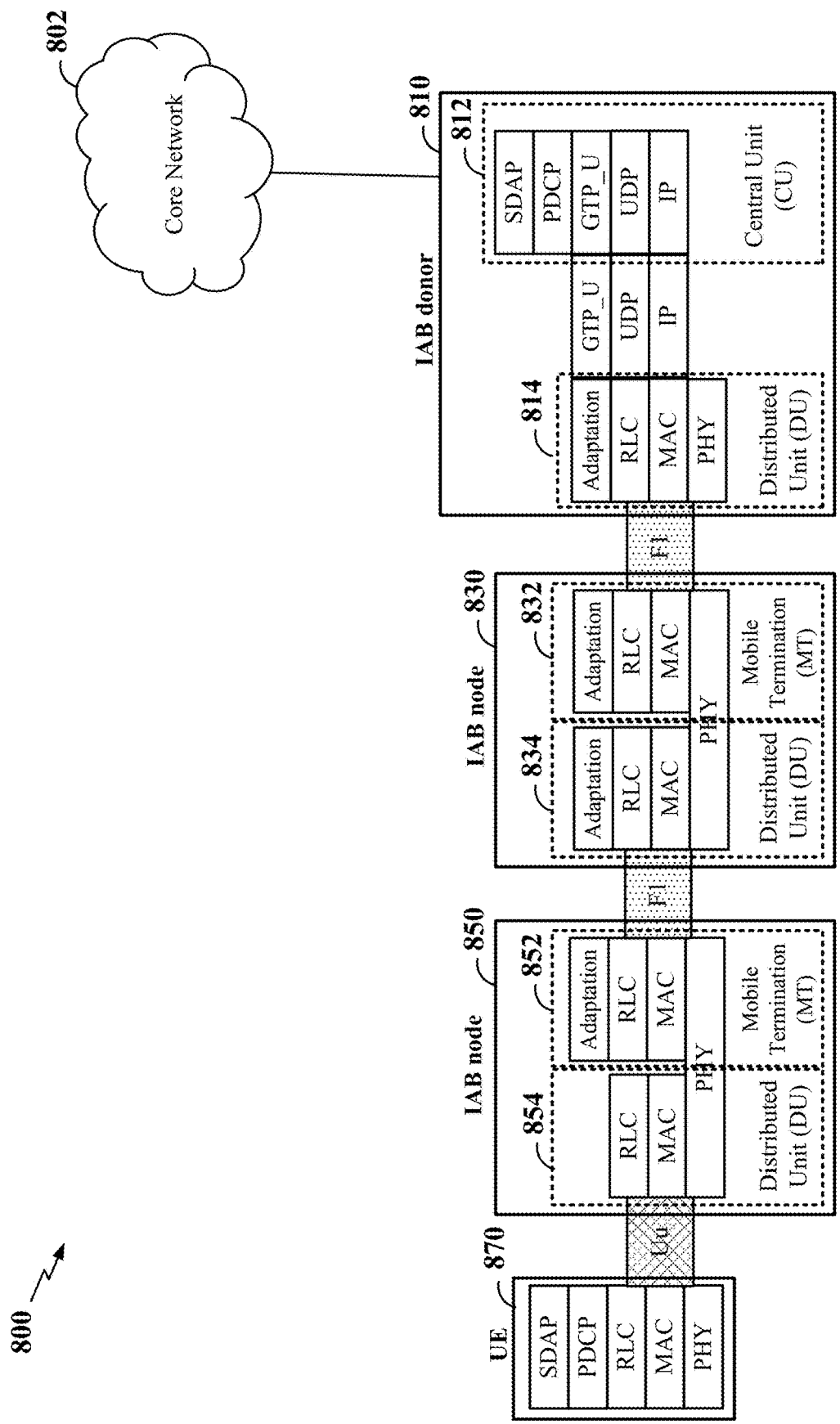
FIG. 8 is an example diagram illustrating an architecture of an IAB network, according to some aspects.

FIG. 8 is an example diagram illustrating an architecture of an IAB network 800, according to some aspects. The IAB network 800 has wireless backhaul capabilities and may serve an IAB donor 810 connected to a core network 802, IAB nodes 830 and 850, and a UE 870. As discussed above, each IAB node may provide an MT function to maintain the wireless backhaul link toward an upstream DU of a parent IAB node or an IAB donor, and may also provide a DU function to provide access link to UEs or downstream MT units of child IAB nodes. An MT IP address may be obtained by a PDU session procedure. The MT unit of an IAB node may connect to an available base station in a similar manner to a UE connecting to an available base station. In an aspect, the MT unit of an IAB node may connect to a CU of the IAB donor via a DU of the IAB donor or another DU not within the IAB donor.

The DU 814 in the IAB donor 810 may connect to a CU 812 in the IAB donor 810 (e.g., via an F1 interface over a wireless backhaul link). The DU 814 of the IAB donor 810 may connect to an MT unit 832 of an IAB node 830 via an F1 interface over a wireless backhaul link, and a DU 834 of the IAB node 830 may connect to an MT unit 852 of an IAB node 850 via an F1 interface over a wireless backhaul link. Further, a DU 854 of the IAB node 850 may connect to the UE 870 via an Uu interface over a wireless access link Therefore, in the IAB network, two types of interfaces such as the Uu interface (between the UEs and the DUs the IAB nodes/IAB donor) and the F1 interface may coexist.

In this approach, a functional split of the radio protocol stack may be utilized. For example, the CU 812 at the IAB donor 810 may have the control functions and the upper layer functions. On the other hand, the lower layer functions are performed by the DUs. To achieve the functional split, the Radio Resource Control (RRC), Service Data Adaptation Protocol (SDAP) and Packet Data Convergence Protocol (PDCP) layers are located in the CU 812 of the IAB donor 810, while RLC, MAC and PHY layers are located in the DUs 814, 835, 854. RLC, MAC and PHY layers are also located in the MT units 852 and 832. Within an IAB node, a physical layer may be shared between the DU and the MT unit. For example a physical layer is shared between the DU 854 and the MT unit 852 of the IAB node 850, and another physical layer is shared between the DU 834 and the MT unit 832 in the IAB node 830. Further, an adaptation layer may be added on top of the RLC layer, to route the data across the IAB network. Therefore, the adaptation layer may provide connections between the DUs of the IAB nodes/the IAB donor and the CU of the IAB donor.

An IAB node in an IAB network may experience a radio link failure (RLF) in a connection between the IAB node and an IAB donor connected to the IAB node, either directly or indirectly via another IAB node. For example, the IAB node may experience an RLF with a parent node, which, for example, communicates with the IAB node via an MT unit of the IAB node. In an example, the IAB node may experience an RLF due to a parent node experiencing the RLF, where the parent node may indicate the RLF experienced by the parent node to the IAB node. Even with the RLF in the connection to the IAB donor, a DU of the IAB node may still have a healthy connection with its child node, which may be a UE or another IAB node.

When the IAB node experiences an RLF, certain types of data may be more adversely affected by the RLF. For example, if an MT unit of a child IAB node is performing a critical communication (e.g., delay-sensitive communication) such as a voice call, a video call, etc., attempting to communicate in case of an RLF may not be desirable, even if a connection affected by the RLF is recovered after some delay. On the other hand, for example, if an MT unit of a child IAB node is performing a non-critical communication (e.g., not delay-sensitive) such as intermittent data communication, text messages, media playback, etc., the data transfer may be delayed without causing errors or adverse results in case of an RLF.

A first IAB node may experience an RLF in a backhaul link of the first IAB node or an RLF in a backhaul link of a parent node of the first IAB node. When the first IAB node experiences the RLF, the first IAB node may indicate the RLF to other IAB nodes. For example, if a child node of the first IAB node is a second IAB node, then the first IAB node may indicate the RLF experienced by the IAB node to the second IAB node via a backhaul link between the first node and the second node. On the other hand, if a child node is a UE, the first IAB node may not indicate the RLF experienced by the first IAB node, e.g., to prevent the UE from being aware of its connection to an IAB network. Hence, no mechanism is available to indicate the RLF experienced by an IAB node to the UE connected to the IAB node, e.g., to cause the UE to perform one or more functions accordingly.

According to some aspects of the disclosure, after an IAB node detects an RLF in a communication between the IAB node and an IAB donor, the IAB node may stop broadcasting synchronization signal blocks (SSBs) to one or more UEs. The one or more UEs may include a UE connected to the IAB and/or a UE that is not connected to the IAB. For example, the IAB node may correspond to any of the IAB nodes illustrated in FIGS. 6-8, the IAB donor may correspond to any of the IAB donors illustrated in FIGS. 6-8, and the UE may correspond to any of the UEs/scheduled entities illustrated in FIGS. 1, 2, 4, and 6-8. The IAB node may determine whether the IAB node has recovered from the RLF. For example, the IAB node may determine that the IAB node has recovered from the RLF when the IAB node and/or a parent node of the IAB node stop experiencing the RLF.

In an aspect, after the RLF has occurred, if the IAB node recovers from the RLF quickly (e.g., within a recovery time threshold), the IAB node may continue broadcasting the SSBs to the one or more UE. On the other hand, in an aspect, if the IAB node does not recover from the RLF within the recovery time threshold, the IAB node may stop broadcasting the SSBs to the one or more UEs, e.g., such that the IAB node may not be detected by the UE. For example, if the IAB node does not recover from the RLF within the recovery time threshold, then the IAB node may assume that the IAB node will experience the RLF for a long time. In an example, the recovery time threshold may be 2-3 seconds.

In another aspect, the IAB node may stop broadcasting SSBs to the one or more UEs immediately after detecting the RLF in the communication between the IAB node and the IAB donor. For example, the IAB node may determine that the IAB node has not recovered from the RLF when the RLF is detected, and thus may stop broadcasting the SSBs to the one or more UEs.

When a UE stops receiving the SSBs from the IAB node that has detected the RLF, the IAB node may no longer be visible to the UE and/or the UE may determine that the IAB node is no longer suitable for communication. Hence, the UE may attempt to find a different cell not operated by the IAB node, such that the UE may re-select to another cell operated by a different base station or IAB node that is not experiencing an RLF. Hence, for example, by not broadcasting the SSBs in case of the RLF, the UE may not receive the SSBs and thus the IAB may cause the UE to perform the cell reselection due to the RLF without explicitly indicating the RLF to the UE.

In an aspect, the IAB node may detect the RLF in a communication between the IAB node and an IAB donor when the IAB node detects the RLF in a backhaul link between the IAB node and a parent node of the IAB node (e.g., upstream backhaul link of the IAB node). In this aspect, the IAB node may determine that the IAB has recovered from the RLF based on whether the backhaul link of the IAB node (e.g., upstream backhaul link to the parent node) has recovered from the RLF.

In an aspect, the IAB node may detect the RLF that exists in a backhaul link (e.g., upstream backhaul link) of another IAB node that is a parent node of the IAB node. For example, the IAB node may detect the RLF in a communication between the IAB node and an IAB donor when the IAB node receives an RLF indicator from a second IAB node connected to the IAB node, where the RLF indicator indicates the RLF in a backhaul link (e.g., upstream backhaul link) of the second IAB node. The second IAB node may be directly connected to the IAB node or may be connected to the IAB node via a third IAB node. In an aspect, the second IAB node may be a parent node of the IAB node, and thus a DU of the second IAB node may be connected with an MT unit of the IAB node. In an example, the IAB node may determine that the IAB node has recovered from the RLF if the backhaul link (e.g., upstream backhaul link) of the second IAB recovers from the RLF. In an example, when the IAB node receives the RLF indicator from the second IAB node, the IAB node may perform a backhaul RLF recovery procedure to find a new IAB node other than the second IAB node or an IAB donor to connect via the backhaul link of the IAB node. In this example, the IAB node may determine that the IAB node has recovered from the RLF if the IAB node connects to the new IAB node or the IAB donor without RLF issues.

Figure 9:
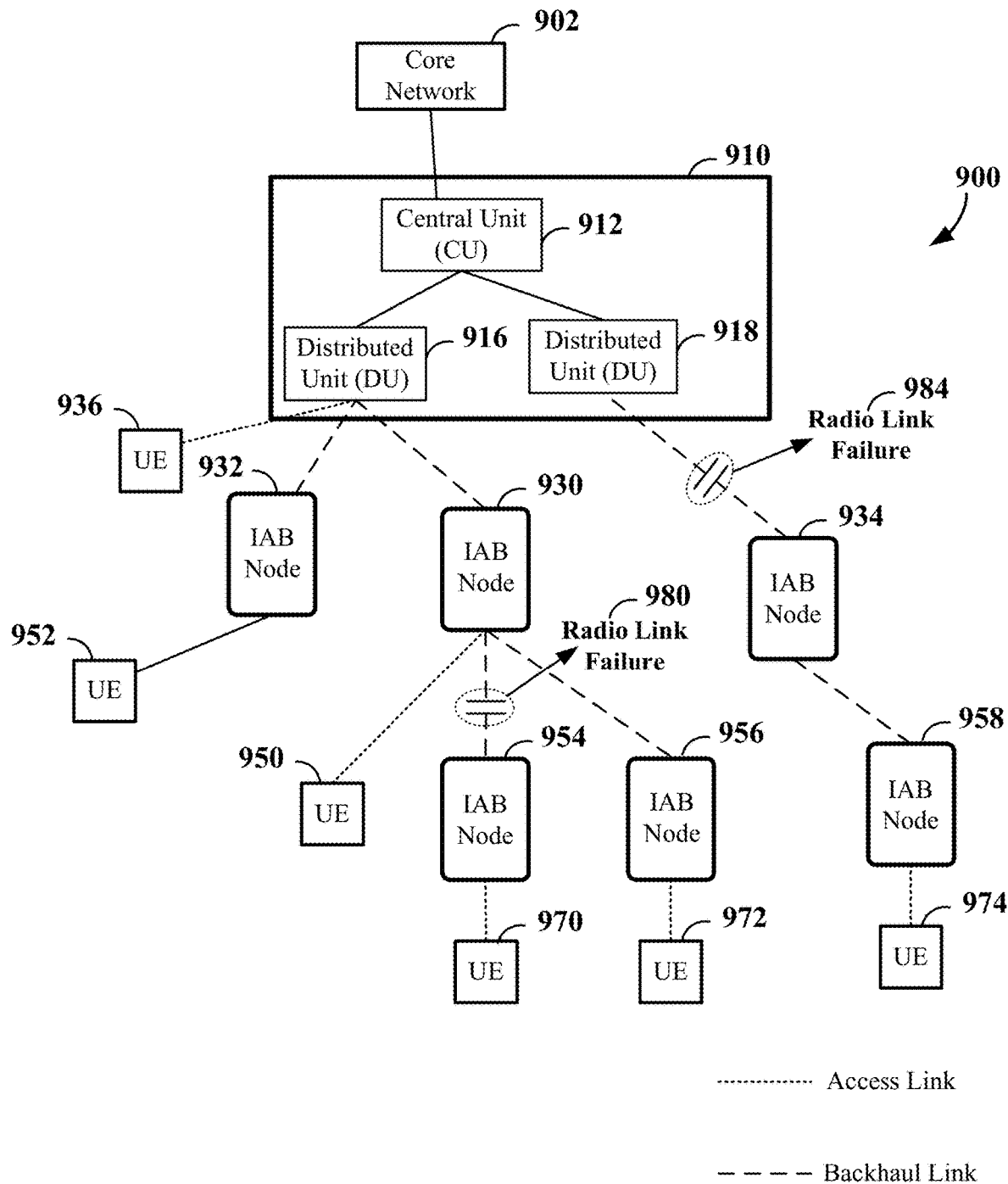
FIG. 9 is an example diagram illustrating a radio link failure with an IAB node in an IAB network, according to some aspects.

FIG. 9 is an example diagram illustrating a radio link failure with an IAB node in an IAB network 900, according to some aspects. The IAB network 900 has a similar structure as the IAB network 700 of FIG. 7. Hence, a core network 902, an IAB donor 910 including a CU 912 and DUs 916 and 918, UEs 936, 950, 952, 970, 972, and 974, and IAB nodes 930, 932, 934, 954, 956, and 958 in the IAB network 900 may be similar to the core network 702, the IAB donor 710 including the CU 712 and the DUs 716 and 718, the UEs 736, 750, 752, 770, 772, and 774, and the IAB nodes 730, 732, 734, 754, 756, and 758 in the IAB network 700, respectively, and thus detailed explanations about these devices are omitted.

In FIG. 9, the IAB node 954 detects an RLF 980 in a communication between the IAB node 954 and the IAB donor 910, which has occurred in a backhaul link between the IAB node 954 and the IAB node 930 (e.g., upstream backhaul link of the IAB node 954). In an aspect, after the RLF 980 has occurred, if the IAB node 954 determines that the IAB node 954 has recovered from the RLF 980 within a recovery time threshold, the IAB node 954 may continue broadcasting SSBs to one or more UEs including the UE 970. For example, the IAB node 954 may determine that the IAB node 954 has recovered from the RLF 980 if the backhaul link between the IAB node 954 and the IAB node 930 recovers from the RLF 980. On the other hand, in an aspect, if the IAB node 954 determines that the IAB node 954 has not recovered from the RLF 980 within the recovery time threshold, the IAB node 954 may refrain from broadcasting the SSBs to one or more UEs including the UE 970. In an alternative aspect, the IAB node 954 may refrain from broadcasting the SSBs to one or more UEs including the UE 970 immediately after detecting the RLF 980 in the communication between the IAB node 954 and the IAB donor 910. In an aspect, if the UE 970 stops receiving the SSBs from the IAB node 954, the UE 970 may attempt to reselect to another cell operated by another base station or another IAB node controlled by the IAB donor 910 (e.g., by the CU 912) such as the IAB nodes 930, 932, and 956. For example, if the UE 970 stops receiving the SSBs from the IAB node 954, the UE 970 may no longer be able to detect the IAB node 954, which may cause the UE 970 to select another cell or another IAB node.

Further, in FIG. 9, the IAB node 958 detects an RLF 984 in a communication between the IAB node 958 and the IAB donor 910, which has occurred in a backhaul link between the IAB node 934 and the DU 918 of the IAB donor 910 (e.g., upstream backhaul link of the IAB node 934). In particular, the IAB node 934 may detect the RLF 984 and may send an RLF indicator to the IAB node 958, such that the IAB node 958 may detect the RLF 984 based on the RLF indicator received from the IAB node 934. In an aspect, after the RLF 984 has occurred, if the IAB node 958 determines that the IAB node 958 has recovered from the RLF 984 within a recovery time threshold, the IAB node 958 may continue sending SSBs to the UE 974. For example, the IAB node 958 may determine that the IAB node 958 has recovered from the RLF 984 if the backhaul link between the IAB node 934 and the DU 918 of the IAB donor 910 recovers from the RLF 984 or if the IAB node 958 connects to another IAB node or another IAB donor without any RLF issues. On the other hand, in an aspect, if the IAB node 958 determines that the IAB node 958 has not recovered from the RLF 984 within the recovery time threshold, the IAB node 958 may refrain from broadcasting the SSBs to one or more UEs including the UE 974. In an alternative aspect, the IAB node 958 may refrain from broadcasting the SSBs to one or more UEs including the UE 974 immediately after detecting the RLF 984 in the communication between the IAB node 958 and the IAB donor 910. In an aspect, if the UE 974 stops receiving the SSBs from the IAB node 958, the UE 974 may attempt to reselect to another cell operated by another base station or another IAB node controlled by the IAB donor 910 (e.g., by the CU 912) such as the IAB nodes 930, 932, and 956. For example, if the UE 974 stops receiving the SSBs from the IAB node 958, the UE 974 may no longer be able to detect the IAB node 958, which may cause the UE 974 to select another cell or another IAB node.

In an aspect, if a rate of data transfer to the UE by the IAB node is low when after the IAB node detects the RLF in the communication between the IAB node and an IAB donor, the IAB node may transmit an inactive mode trigger signal to trigger the UE to enter an inactive mode and/or a release signal to cause the UE to release a connection between the UE and the IAB node. In an aspect, the IAB node may transmit the inactive mode trigger signal and/or the release signal via an RRC message (e.g., RRC release message). The IAB node may determine that the rate of data transfer is low based on an amount of data transfer and/or a type of data activity associated with the data transfer. For example, if the rate of data transfer is below a data transfer threshold, the IAB may determine that the rate of data transfer is low. In one example, the data transfer threshold may be 10 bytes. For example, if the IAB node determines that the rate of data transfer is significantly lower than an expected rate of data transfer based on a type of data activity, the IAB node may determine that the rate of data transfer is low. For example, the IAB node may determine that the rate of data transfer is significantly lower than the expected rate of data transfer for a particular type of data activity, if the rate of data transfer is below 10% of the expected rate of data transfer for the particular type of activity. In this example, the data transfer threshold may be based on 10% of the expected rate of data transfer for the particular type of data activity. For example, the expected rate of data transfer for video streaming may be higher than the expected rate of data transfer for audio streaming or a voice call.

In an aspect, for a particular type of data activity (e.g., delay-sensitive data activity such as a voice call), the IAB node may transmit the inactive mode trigger signal and/or the release signal immediately after detecting the RLF. In an example, if the type of data activity is a delay-sensitive data activity or a high-priority data activity, the IAB node may transmit the inactive mode trigger signal and/or the release signal when the RLF is detected regardless of the rate of data transfer to the UE. In an example, if the type of data activity is a delay-sensitive data activity or a high-priority data activity, the IAB node may set the data transfer threshold to an expected rate of data transfer for such a type of data activity, such that the IAB node may transmit the inactive mode trigger signal and/or the release signal if the rate of data transfer is below the expected rate of data transfer.

In an aspect, when the UE is triggered to enter an inactive mode based on the inactive mode trigger signal, the UE may perform a synchronization process again. If the UE still cannot detect an SSB during the synchronization process, the UE may reselect to a new cell to establish a new connection with another base station or an IAB node or an IAB donor in the new cell.

Due to the RLF in the communication between the IAB node and the IAB donor, when the UE attempts to transmit data, the transmission of the data may not be successfully performed, and thus the UE may attempt to re-transmit the data. For example, if the data cannot be successfully transmitted after a certain number of re-transmission attempts, the UE may determine that an RLF or a communication error has occurred, and thus may reselect to another cell. The maximum number of re-transmissions for the UE to perform before determining the RLF may be configured by the IAB node, e.g., via an RRC message. As discussed above, when the IAB node detects the RLF in the communication between the IAB node and the IAB donor, the IAB node may not indicate the RLF to the UE. Hence, in an aspect, the IAB node may reconfigure the UE to reduce a maximum number of re-transmissions by the UE when the IAB node detects the RLF in the communication between the IAB node and the IAB donor. In an example, the re-transmission may involve re-transmission of channel data, such as control data, user data, etc. By reducing the maximum number of re-transmissions by the UE when the RLF is detected, the IAB node may cause the UE to determine the RLF more quickly. For example, the UE may be initially configured with a maximum number of re-transmissions of 8 without the RLF, and when the RLF is detected, the IAB node may reconfigure the UE to reduce the maximum number of re-transmissions to 1 or 2 or 3, such that the UE may determine the RLF more quickly. For example, the IAB node may reduce the maximum number of re-transmissions when the RLF is detected, and may transmit the reduced maximum number of re-transmissions to the UE to reconfigure the UE with the reduced maximum number of re-transmissions. In an example, the reduced maximum number of re-transmissions may be transmitted to the UE via an RRC reconfiguration message.

In an aspect, if the UE has initiated a RACH process, the IAB node may reconfigure the UE to reduce a maximum number of RACH attempts by the UE when the IAB node detects the RLF in the communication between the IAB node and the IAB donor. By reducing the maximum number of RACH attempts by the UE when the RLF is detected, the IAB node may cause the UE to determine the RLF more quickly. For example, the UE may be initially configured with a maximum number of RACH attempts of 10 without the RLF, and when the RLF is detected, the IAB node may reconfigure the UE to reduce the maximum number of RACH attempts to 1 or 2, such that the UE may determine the RLF more quickly. For example, the IAB node may reduce the maximum number of RACH attempts when the RLF is detected, and may transmit the reduced maximum number of RACH attempts to the UE to reconfigure the UE with the reduced maximum number of RACH attempts. In an example, the reduced maximum number of RACH attempts may be transmitted to the UE via an RRC reconfiguration message.

In an aspect, the IAB node may reconfigure the UE to reduce a transmit power value of the UE when the IAB node detects the RLF in the communication between the IAB node and the IAB donor. In an example, the transmit power value of the UE may be reduced through a transmit power control (TPC) or reconfiguration. When the RLF in the communication between the IAB node and the IAB donor exists, the UE connected to the IAB node should not spend much power on data transmission to the IAB node. By reducing the TX power, the power for the UE may be conserved when the RLF in a communication chain of the UE exists. For example, the IAB node may reduce the transmit power value of the UE when the RLF is detected, and may transmit the reduced transmit power value of the UE to the UE to reconfigure the UE with the reduced transmit power value. In an example, the reduced transmit power value may be transmitted to the UE via a MAC-CE. In an example, the reduced transmit power value may be a minimum transmit power value. The minimum transmit power value may be 0 or −40 dB, for example.

In an aspect, when the IAB node that has detected the RLF receives UL data from the UE, the IAB node may transmit a NACK for each UL data from the UE. By transmitting a NACK for each UL data, the IAB node may cause the UE to reselect to another cell operated by a different base station. In an aspect, when the IAB node that has detected the RLF receives UL data from the UE, the IAB node may not transmit any response, and thus may not transmit an ACK or a NACK for each UL data from the UE.

In an aspect, depending on a type of data activity, the IAB node may hold UL data from the UE until the IAB node recovers from the RLF. If the data activity associated with communication with the IAB node is a critical data activity, no UL data will be held by the IAB node. On the other hand, if a data activity associated with communication with the IAB node is a non-critical data activity between the IAB node and the UE or a child IAB node, the IAB node (e.g., via a DU of the IAB node) may hold UL data from the child IAB nodes/UE associated with the non-critical data activity if the IAB node can recover from the RLF within a hold time limit. If the IAB node cannot recover from the RLF within the hold time limit, the IAB node may discard the UL data held by the IAB node. In an aspect, if the IAB node cannot recover from the RLF within the hold time limit, the IAB node may reconfigure the UE to reduce the maximum number of re-transmissions and/or the maximum number of RACH attempts and/or the transmit power value of the UE, and/or may refrain from transmitting SSBs to the UE, as discussed above. For example, if the IAB node experiences an RLF in a backhaul link of the IAB node and an MT unit of the IAB node can re-establish the connection in the backhaul link of the IAB node within the hold time limit, the UL data held by the IAB node may be communicated via the backhaul link of the IAB node after the connection is re-established. For example, the non-critical data activity may be a data activity that is not delay-sensitive such as intermittent data communication, text messages, media playback, etc.

If the data activity is a critical data activity, the IAB node may discard the UL data when the IAB node detects the RLF. For example, the critical data activity may be delay-sensitive data activity such as a voice call, a video call, etc. In an aspect, for the critical data activity, any interruption in communication caused by the RLF may adversely affect the critical data activity, and thus the IAB node may not hold the UL data and may discard the UL data in case of the RLF.

Figure 10:
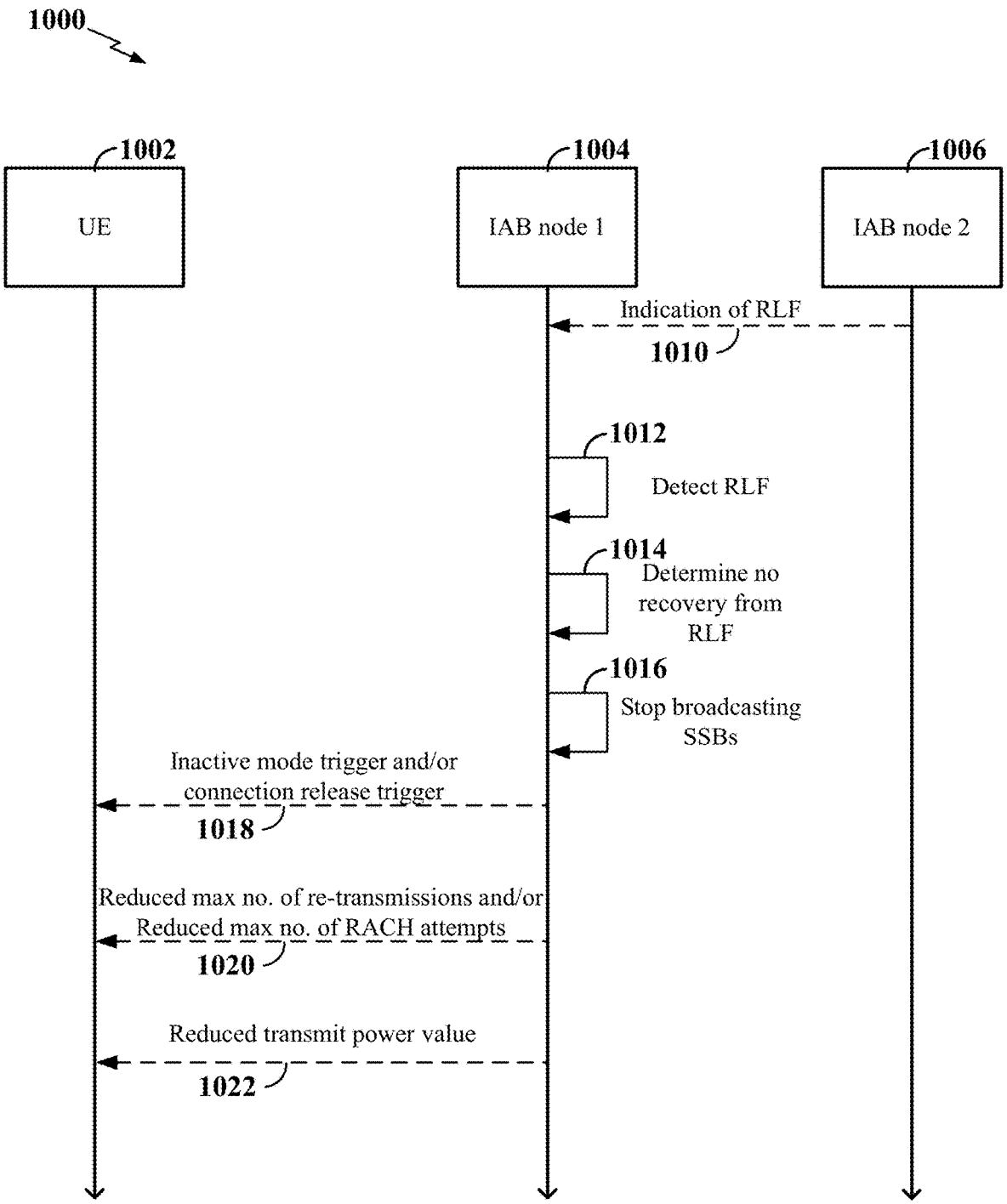
FIG. 10 is an example flow diagram illustrating interactions among a user equipment (UE) and one or more IAB nodes, according to some aspects.

FIG. 10 is an example flow diagram 1000 illustrating interactions among a UE and one or more IAB nodes, according to some aspects. In FIG. 10, a first IAB node 1004 may be connected to a UE 1002 via an access link. In an aspect, the first IAB node 1004 may be connected to the UE 1002 using a DU of the first IAB node 1004. Hence, the UE 1002 may be a child node of the first IAB node 1004. In an aspect, the first IAB node 1004 may be connected to a second IAB node 1006 via a backhaul link, where the second IAB node 1006 is connected to an IAB donor. In this aspect, the first IAB node 1004 may be connected to the IAB donor via the second IAB node 1006. In an aspect, the first IAB node 1004 and the second IAB node 1006 may be connected to each other via an MT unit of the first IAB node 1004 and a DU of the second IAB node 1006. Hence, the second IAB node 1006 may be a parent node of the first IAB node 1004. In another aspect, the first IAB node 1004 may be directly connected to an IAB donor via the backhaul link, without involving the second IAB node 1006.

In an aspect, when the first IAB node 1004 is connected to the second IAB node 1006 via the backhaul link of the first IAB node 1004, an RLF may occur with the second IAB node 1006 or a parent node of the second IAB node 1006. In such an aspect, at 1010, the second IAB node 1006 may transmit an RLF indicator to the first IAB node 1004 via the backhaul link between the first IAB node 1004 and the second IAB node 1006 (e.g., upstream backhaul link of the first IAB node 1004), where the RLF indicator indicates the RLF in an upstream backhaul link of the second IAB node 1006.

At 1012, the first IAB node 1004 may detect an RLF in a communication between the first IAB node 1004 and the IAB donor. In an aspect, the RLF may occur in an upstream backhaul link of the first IAB node 1004 connected to its parent node, which may be detected by the first IAB node 1004. In an aspect, the first IAB node 1004 may detect the RLF based on the RLF indicator received from the second IAB node 1006, e.g., at 1010.

At 1014, the first IAB node 1004 may determine the first IAB node 1004 has not recovered from the RLF. According to one approach, the first IAB node 1004 may determine that the first IAB node 1004 has not recovered from the RLF if the first IAB node 1004 has not recovered from the RLF within a recovery time threshold. According to another approach, the first IAB node 1004 may determine that the first IAB node 1004 has not recovered from the RLF when the RLF is detected.

At 1016, the first IAB node 1004 may refrain from broadcasting SSBs to the UE 1002. When the UE 1002 stops receiving the SSBs from the first IAB node 1004, the UE may initiate a process to reselect to another cell operated by a different base station or IAB node.

In an aspect, at 1018, after detecting the RLF, the first IAB node 1004 may transmit an inactive mode trigger signal or a release signal to the UE 1002. If the UE 1002 receives the inactive mode trigger signal, the UE 1002 may enter into an inactive mode. If the UE 1002 receives the release signal, the UE 1002 may release the connection between the UE 1002 and the first IAB node 1004.

In an aspect, at 1020, after detecting the RLF, the first IAB node 1004 may reduce a maximum number of re-transmissions by the UE 1002 and/or a maximum number of RACH attempts by the UE 1002, and then transmit the reduced maximum number of re-transmissions and/or the reduced maximum number of RACH attempts to the UE 1002. For example, with the reduced maximum number of re-transmissions and/or the reduced maximum number of RACH attempts, the UE 1002 may determine the RLF more quickly.

In an aspect, at 1022, after detecting the RLF, the first IAB node 1004 may reduce a transmit power value of the UE 1002, and then transmit the reduced transmit power value to the UE 1002. As such, for example, the UE 1002 may conserve its transmit power with the reduced transmit power value during the RLF.

Figure 11:
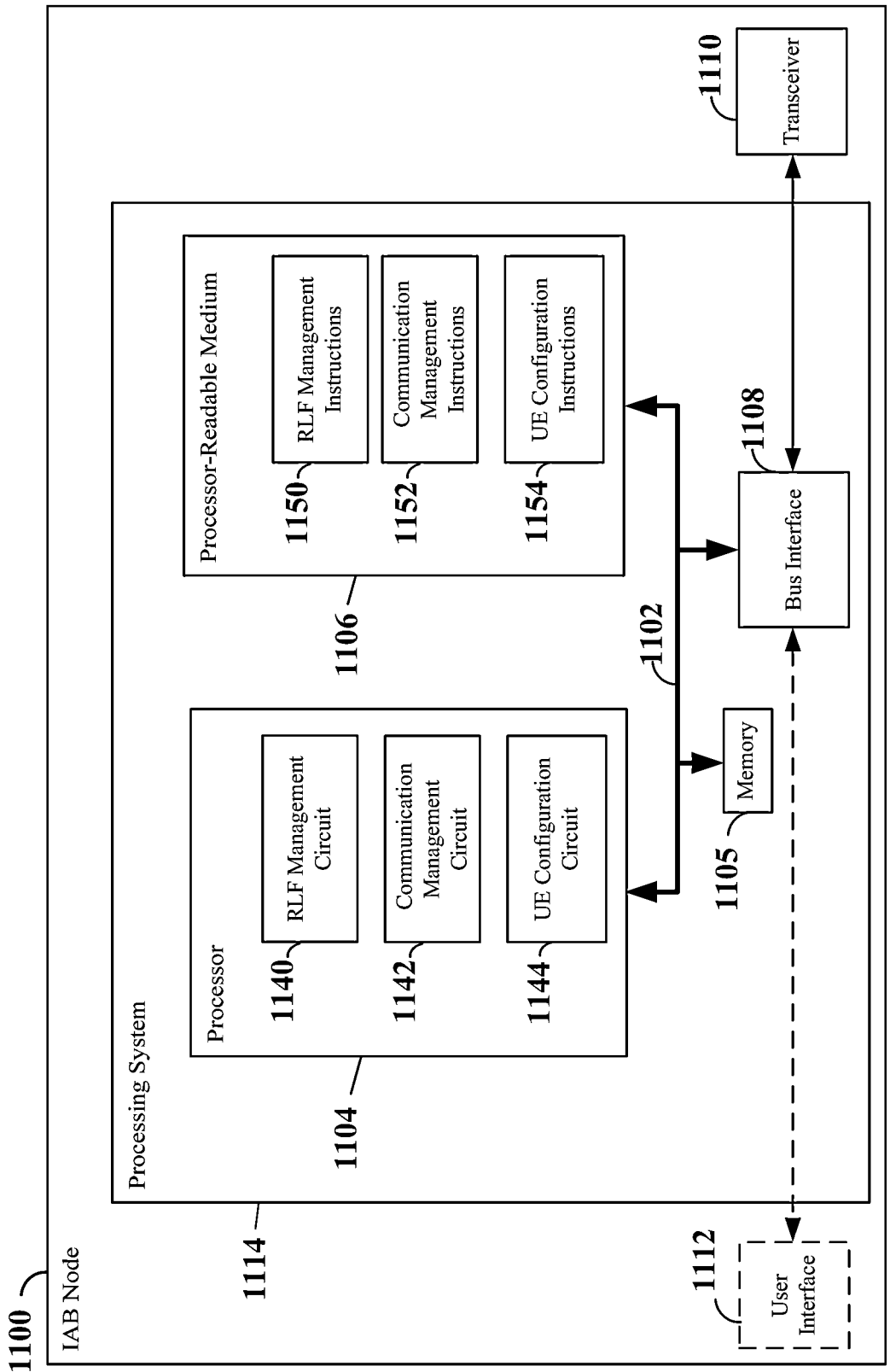
FIG. 11 is a block diagram illustrating an example of a hardware implementation for an IAB node employing a processing system according to some aspects.

FIG. 11 is a block diagram illustrating an example of a hardware implementation for an IAB node 1100 employing a processing system 1114. For example, the IAB node 1100 may be an IAB node or a base station/gNB operating as an IAB node as illustrated in any one or more of FIGS. 1, 2, 4, and 6-10.

The IAB node 1100 may be implemented with a processing system 1114 that includes one or more processors 1104. Examples of processors 1104 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. In various examples, the IAB node 1100 may be configured to perform any one or more of the functions described herein. That is, the processor 1104, as utilized in the IAB node 1100, may be used to implement any one or more of the processes and procedures described below and illustrated in FIGS. 12-13.

In this example, the processing system 1114 may be implemented with a bus architecture, represented generally by the bus 1102. The bus 1102 may include any number of interconnecting buses and bridges depending on the specific application of the processing system 1114 and the overall design constraints. The bus 1102 communicatively couples together various circuits including one or more processors (represented generally by the processor 1104), a memory 1105, and processor-readable storage media (represented generally by the processor-readable storage medium 1106). The bus 1102 may also link various other circuits such as timing sources, peripherals, voltage regulators, and power management circuits, which are well known in the art, and therefore, will not be described any further. A bus interface 1108 provides an interface between the bus 1102 and a transceiver 1110. The transceiver 1110 provides a communication interface or means for communicating with various other apparatus over a transmission medium. Depending upon the nature of the apparatus, a user interface 1112 (e.g., keypad, display, speaker, microphone, joystick) may also be provided. Of course, such a user interface 1112 is optional, and may be omitted in some examples, such as a base station.

In some aspects of the disclosure, the processor 1104 may include an RLF management circuit 1140 configured for various functions, including, for example, detecting a radio link failure in a communication between the IAB node and an IAB donor. For example, the RLF management circuit 1140 may be configured to implement one or more of the functions described below in relation to FIGS. 12-13, including, e.g., blocks 1202 and 1302.

In some aspects, the RLF management circuit 1140 may be configured for various functions, including, for example, determining whether the IAB node has recovered from the radio link failure For example, the RLF management circuit 1140 may be configured to implement one or more of the functions described below in relation to FIGS. 12-13, including, e.g., blocks 1204 and 1304.

In some aspects of the disclosure, the processor 1104 may include a communication management circuit 1142 configured for various functions, including, for example, refraining from broadcasting one or more SSBs to one or more UEs including a UE connected to the IAB node in response to determining that the IAB node has not recovered from the radio link failure. For example, the communication management circuit 1142 may be configured to implement one or more of the functions described below in relation to FIGS. 12-13, including, e.g., blocks 1206 and 1306.

In some aspects, the communication management circuit 1142 may be configured for various functions, including, for example, determining, in response to detecting the radio link failure, whether a rate of data transfer to the UE is below a data transfer threshold. For example, the communication management circuit 1142 may be configured to implement one or more of the functions described below in relation to FIG. 13, including, e.g., block 1308.

In some aspects, the communication management circuit 1142 may be configured for various functions, including, for example, transmitting, in response to determining that the rate of data transfer is below the data transfer threshold, to the UE at least one of an inactive mode trigger signal to trigger the UE to enter an inactive mode, or a release signal to cause the UE to release a connection between the UE and the IAB node. For example, the communication management circuit 1142 may be configured to implement one or more of the functions described below in relation to FIG. 13, including, e.g., block 1310.

In some aspects, the communication management circuit 1142 may be configured for various functions, including, for example, receiving uplink data from the UE after detecting the radio link failure. For example, the communication management circuit 1142 may be configured to implement one or more of the functions described below in relation to FIG. 13, including, e.g., block 1312.

In some aspects, the communication management circuit 1142 may be configured for various functions, including, for example, determining whether the uplink data is associated with a non-critical data activity. For example, the communication management circuit 1142 may be configured to implement one or more of the functions described below in relation to FIG. 13, including, e.g., block 1314.

In some aspects, the communication management circuit 1142 may be configured for various functions, including, for example, holding, in response to determining that the uplink data is associated with the non-critical data activity, the uplink data at least until determining that the IAB node has recovered from the radio link failure. For example, the communication management circuit 1142 may be configured to implement one or more of the functions described below in relation to FIG. 13, including, e.g., block 1316.

In some aspects, the communication management circuit 1142 may be configured for various functions, including, for example, discarding the uplink data in response to at least one of determining that the uplink data is associated with a critical data activity, or determining that the IAB node has not recovered from the radio link failure. For example, the communication management circuit 1142 may be configured to implement one or more of the functions described below in relation to FIG. 13, including, e.g., block 1318.

In some aspects, the communication management circuit 1142 may be configured for various functions, including, for example, transmitting the reduced maximum number of re-transmission to the UE. For example, the communication management circuit 1142 may be configured to implement one or more of the functions described below in relation to FIG. 13, including, e.g., block 1356.

In some aspects, the communication management circuit 1142 may be configured for various functions, including, for example, transmitting the reduced maximum number of RACH attempts to the UE. For example, the communication management circuit 1142 may be configured to implement one or more of the functions described below in relation to FIG. 13, including, e.g., block 1360.

In some aspects, the communication management circuit 1142 may be configured for various functions, including, for example, transmitting, to the UE, the reduced transmit power value of the UE. For example, the communication management circuit 1142 may be configured to implement one or more of the functions described below in relation to FIG. 13, including, e.g., block 1364.

In some aspects, the communication management circuit 1142 may be configured for various functions, including, for example, receiving one or more uplink transmissions from the UE after detecting the radio link failure. For example, the communication management circuit 1142 may be configured to implement one or more of the functions described below in relation to FIG. 13, including, e.g., block 1366.

In some aspects, the communication management circuit 1142 may be configured for various functions, including, for example, performing, in response to the one or more uplink transmissions, at least one of transmitting, to the UE, a NACK for each of the one or more uplink transmission received from the UE after detecting the radio link failure, or refraining from transmitting an ACK or the NACK for each of the one or more uplink transmission received from the UE after detecting the radio link failure. For example, the communication management circuit 1142 may be configured to implement one or more of the functions described below in relation to FIG. 13, including, e.g., block 1368.

In some aspects, the communication management circuit 1142 may be configured for various functions, including, for example, performing, in response to the one or more uplink transmissions, at least one of transmitting, to the UE, a NACK for each of the one or more uplink transmission received from the UE after detecting the radio link failure, or refraining from transmitting an ACK or the NACK for each of the one or more uplink transmission received from the UE after detecting the radio link failure. For example, the communication management circuit 1142 may be configured to implement one or more of the functions described below in relation to FIG. 13, including, e.g., block 1368.

In some aspects of the disclosure, the processor 1104 may include a UE configuration circuit 1144 configured for various functions, including, for example, reducing a maximum number of re-transmissions by the UE in response to detecting the radio link failure, the maximum number of re-transmissions indicating a maximum number of times the UE attempts to re-transmit data to the IAB node before determining a connection failure. For example, the UE configuration circuit 1144 may be configured to implement one or more of the functions described below in relation to FIG. 13 including, e.g., block 1354.

In some aspects, the UE configuration circuit 1144 may be configured for various functions, including, for example, reducing a maximum number of RACH attempts by the UE in response to detecting the radio link failure, the maximum number of RACH attempts indicating a maximum number of times the UE attempts to initiate a RACH process with the IAB node before determining a RACH failure. For example, the UE configuration circuit 1144 may be configured to implement one or more of the functions described below in relation to FIG. 13 including, e.g., block 1358.

In some aspects, the UE configuration circuit 1144 may be configured for various functions, including, for example, reducing a transmit power value of the UE in response to detecting the radio link failure. For example, the UE configuration circuit 1144 may be configured to implement one or more of the functions described below in relation to FIG. 13 including, e.g., block 1362.

The processor 1104 is responsible for managing the bus 1102 and general processing, including the execution of software stored on the processor-readable storage medium 1106. The software, when executed by the processor 1104, causes the processing system 1114 to perform the various functions described below for any particular apparatus. The processor-readable storage medium 1106 and the memory 1105 may also be used for storing data that is manipulated by the processor 1104 when executing software.

One or more processors 1104 in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a processor-readable storage medium 1106. The processor-readable storage medium 1106 may be a non-transitory processor-readable storage medium. A non-transitory processor-readable storage medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The processor-readable storage medium 1106 may reside in the processing system 1114, external to the processing system 1114, or distributed across multiple entities including the processing system 1114. The processor-readable storage medium 1106 may be embodied in a computer program product. By way of example, a computer program product may include a processor-readable storage medium in packaging materials. Those skilled in the art will recognize how best to implement the described functionality presented throughout this disclosure depending on the particular application and the overall design constraints imposed on the overall system.

In some aspects of the disclosure, the processor-readable storage medium 1106 may include an RLF management software/instructions 1150 configured for various functions, including, for example, detecting a radio link failure in a communication between the IAB node and an IAB donor. For example, the RLF management software/instructions 1150 may be configured to implement one or more of the functions described below in relation to FIGS. 12-13, including, e.g., blocks 1202 and 1302.

In some aspects, the RLF management software/instructions 1150 may be configured for various functions, including, for example, determining whether the IAB node has recovered from the radio link failure For example, the RLF management software/instructions 1150 may be configured to implement one or more of the functions described below in relation to FIGS. 12-13, including, e.g., blocks 1204 and 1304.

In some aspects of the disclosure, the processor-readable storage medium 1106 may include a communication management software/instructions 1152 configured for various functions, including, for example, refraining from broadcasting one or more SSBs to one or more UEs including a UE connected to the IAB node in response to determining that the IAB node has not recovered from the radio link failure. For example, the communication management software/instructions 1152 may be configured to implement one or more of the functions described below in relation to FIGS. 12-13, including, e.g., blocks 1206 and 1306.

In some aspects, the communication management software/instructions 1152 may be configured for various functions, including, for example, determining, in response to detecting the radio link failure, whether a rate of data transfer to the UE is below a data transfer threshold. For example, the communication management software/instructions 1152 may be configured to implement one or more of the functions described below in relation to FIG. 13, including, e.g., block 1308.

In some aspects, the communication management software/instructions 1152 may be configured for various functions, including, for example, transmitting, in response to determining that the rate of data transfer is below the data transfer threshold, to the UE at least one of an inactive mode trigger signal to trigger the UE to enter an inactive mode, or a release signal to cause the UE to release a connection between the UE and the IAB node. For example, the communication management software/instructions 1152 may be configured to implement one or more of the functions described below in relation to FIG. 13, including, e.g., block 1310.

In some aspects, the communication management software/instructions 1152 may be configured for various functions, including, for example, receiving uplink data from the UE after detecting the radio link failure. For example, the communication management software/instructions 1152 may be configured to implement one or more of the functions described below in relation to FIG. 13, including, e.g., block 1312.

In some aspects, the communication management software/instructions 1152 may be configured for various functions, including, for example, determining whether the uplink data is associated with a non-critical data activity. For example, the communication management software/instructions 1152 may be configured to implement one or more of the functions described below in relation to FIG. 13, including, e.g., block 1314.

In some aspects, the communication management software/instructions 1152 may be configured for various functions, including, for example, holding, in response to determining that the uplink data is associated with the non-critical data activity, the uplink data at least until determining that the IAB node has recovered from the radio link failure. For example, the communication management software/instructions 1152 may be configured to implement one or more of the functions described below in relation to FIG. 13, including, e.g., block 1316.

In some aspects, the communication management software/instructions 1152 may be configured for various functions, including, for example, discarding the uplink data in response to at least one of determining that the uplink data is associated with a critical data activity, or determining that the IAB node has not recovered from the radio link failure. For example, the communication management software/instructions 1152 may be configured to implement one or more of the functions described below in relation to FIG. 13, including, e.g., block 1318.

In some aspects, the communication management software/instructions 1152 may be configured for various functions, including, for example, transmitting the reduced maximum number of re-transmission to the UE. For example, the communication management software/instructions 1152 may be configured to implement one or more of the functions described below in relation to FIG. 13, including, e.g., block 1356.

In some aspects, the communication management software/instructions 1152 may be configured for various functions, including, for example, transmitting the reduced maximum number of RACH attempts to the UE. For example, the communication management software/instructions 1152 may be configured to implement one or more of the functions described below in relation to FIG. 13, including, e.g., block 1360.

In some aspects, the communication management software/instructions 1152 may be configured for various functions, including, for example, transmitting, to the UE, the reduced transmit power value of the UE. For example, the communication management software/instructions 1152 may be configured to implement one or more of the functions described below in relation to FIG. 13, including, e.g., block 1364.

In some aspects, the communication management software/instructions 1152 may be configured for various functions, including, for example, receiving one or more uplink transmissions from the UE after detecting the radio link failure. For example, the communication management software/instructions 1152 may be configured to implement one or more of the functions described below in relation to FIG. 13, including, e.g., block 1366.

In some aspects, the communication management software/instructions 1152 may be configured for various functions, including, for example, performing, in response to the one or more uplink transmissions, at least one of transmitting, to the UE, a NACK for each of the one or more uplink transmission received from the UE after detecting the radio link failure, or refraining from transmitting an ACK or the NACK for each of the one or more uplink transmission received from the UE after detecting the radio link failure. For example, the communication management software/instructions 1152 may be configured to implement one or more of the functions described below in relation to FIG. 13, including, e.g., block 1368.

In some aspects, the communication management software/instructions 1152 may be configured for various functions, including, for example, performing, in response to the one or more uplink transmissions, at least one of transmitting, to the UE, a NACK for each of the one or more uplink transmission received from the UE after detecting the radio link failure, or refraining from transmitting an ACK or the NACK for each of the one or more uplink transmission received from the UE after detecting the radio link failure. For example, the communication management software/instructions 1152 may be configured to implement one or more of the functions described below in relation to FIG. 13, including, e.g., block 1368.

In some aspects of the disclosure, the processor-readable storage medium 1106 may include a UE configuration software/instructions 1154 configured for various functions, including, for example, reducing a maximum number of re-transmissions by the UE in response to detecting the radio link failure, the maximum number of re-transmissions indicating a maximum number of times the UE attempts to re-transmit data to the IAB node before determining a connection failure. For example, the UE configuration software/instructions 1154 may be configured to implement one or more of the functions described below in relation to FIG. 13 including, e.g., block 1354.

In some aspects, the UE configuration software/instructions 1154 may be configured for various functions, including, for example, reducing a maximum number of RACH attempts by the UE in response to detecting the radio link failure, the maximum number of RACH attempts indicating a maximum number of times the UE attempts to initiate a RACH process with the IAB node before determining a RACH failure. For example, the UE configuration software/instructions 1154 may be configured to implement one or more of the functions described below in relation to FIG. 13 including, e.g., block 1358.

In some aspects, the UE configuration software/instructions 1154 may be configured for various functions, including, for example, reducing a transmit power value of the UE in response to detecting the radio link failure. For example, the UE configuration software/instructions 1154 may be configured to implement one or more of the functions described below in relation to FIG. 13 including, e.g., block 1362.

Figure 12:
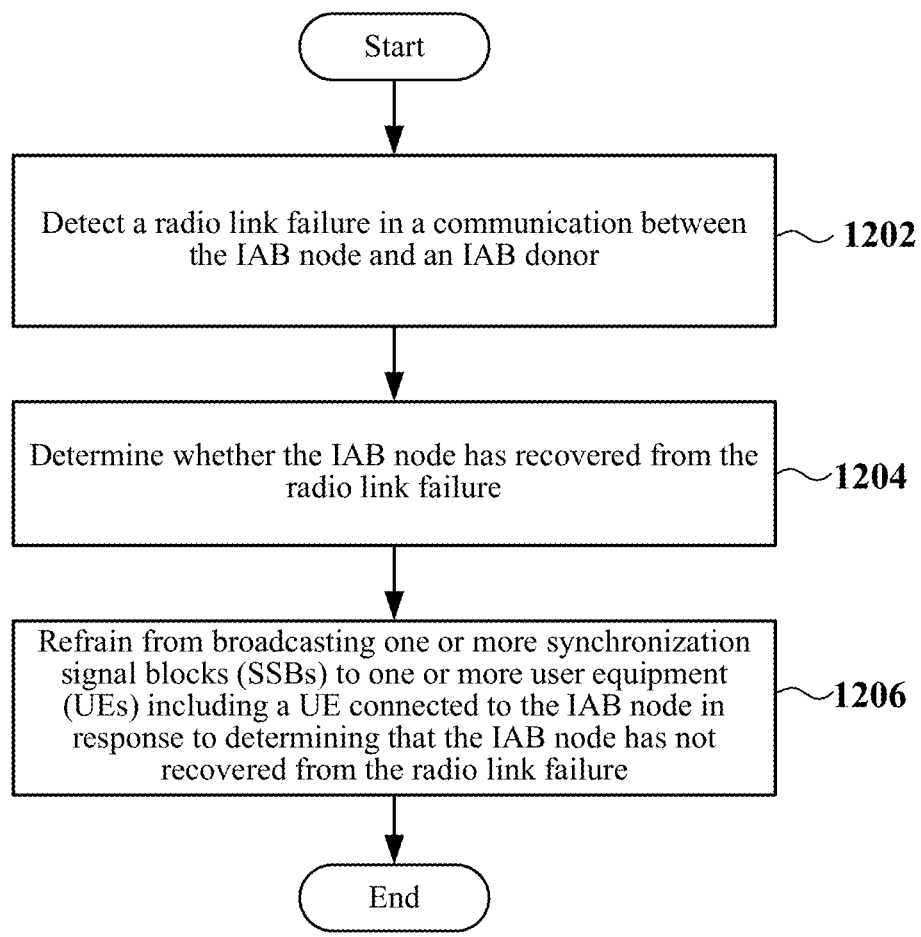
FIG. 12 is a flow chart illustrating an exemplary process for wireless communication by an IAB node according to some aspects of the disclosure.

FIG. 12 is a flow chart illustrating an exemplary process 1200 for wireless communication by an IAB node in accordance with some aspects of the present disclosure. As described below, some or all illustrated features may be omitted in a particular implementation within the scope of the present disclosure, and some illustrated features may not be required for implementation of all embodiments. In some examples, the process 1200 may be carried out by the IAB node 1100 illustrated in FIG. 11. In some examples, the process 1200 may be carried out by any suitable apparatus or means for carrying out the functions or algorithm described below.

At block 1202, the process 1200 may include detecting a radio link failure in a communication between the IAB node and an IAB donor. For example, the RLF management circuit 1140 shown and described above in connection with FIG. 11 may provide means for detecting the radio link failure.

At block 1204, the process 1200 may include determining whether the IAB node has recovered from the radio link failure. For example, the RLF management circuit 1140 shown and described above in connection with FIG. 11 may provide means for determining whether the IAB node has recovered from the radio link failure.

At block 1206, the process 1200 may include refraining from broadcasting one or more SSBs to one or more UEs including a UE connected to the IAB node in response to determining that the IAB node has not recovered from the radio link failure. For example, the communication management circuit 1142 shown and described above in connection with FIG. 11 may provide means for refraining from broadcasting the one or more SSBs.

In one configuration, the IAB node 1100 for wireless communication includes means for detecting a radio link failure in a communication between the IAB node and an IAB donor, means for determining whether the IAB node has recovered from the radio link failure, and means for refraining from broadcasting one or more SSBs to one or more UEs including a UE connected to the IAB node in response to determining that the IAB node has not recovered from the radio link failure. In one aspect, the aforementioned means may be the processor 1104 shown in FIG. 11 configured to perform the functions recited by the aforementioned means. In another aspect, the aforementioned means may be a circuit or any apparatus configured to perform the functions recited by the aforementioned means.

Of course, in the above examples, the circuitry included in the processor 1104 is merely provided as an example, and other means for carrying out the described functions may be included within various aspects of the present disclosure, including but not limited to the instructions stored in the processor-readable storage medium 1106, or any other suitable apparatus or means described in any one of the FIGS. 1, 2, 4, and/or 6-10, and utilizing, for example, the processes and/or algorithms described herein in relation to FIG. 12.

Figure 13A:
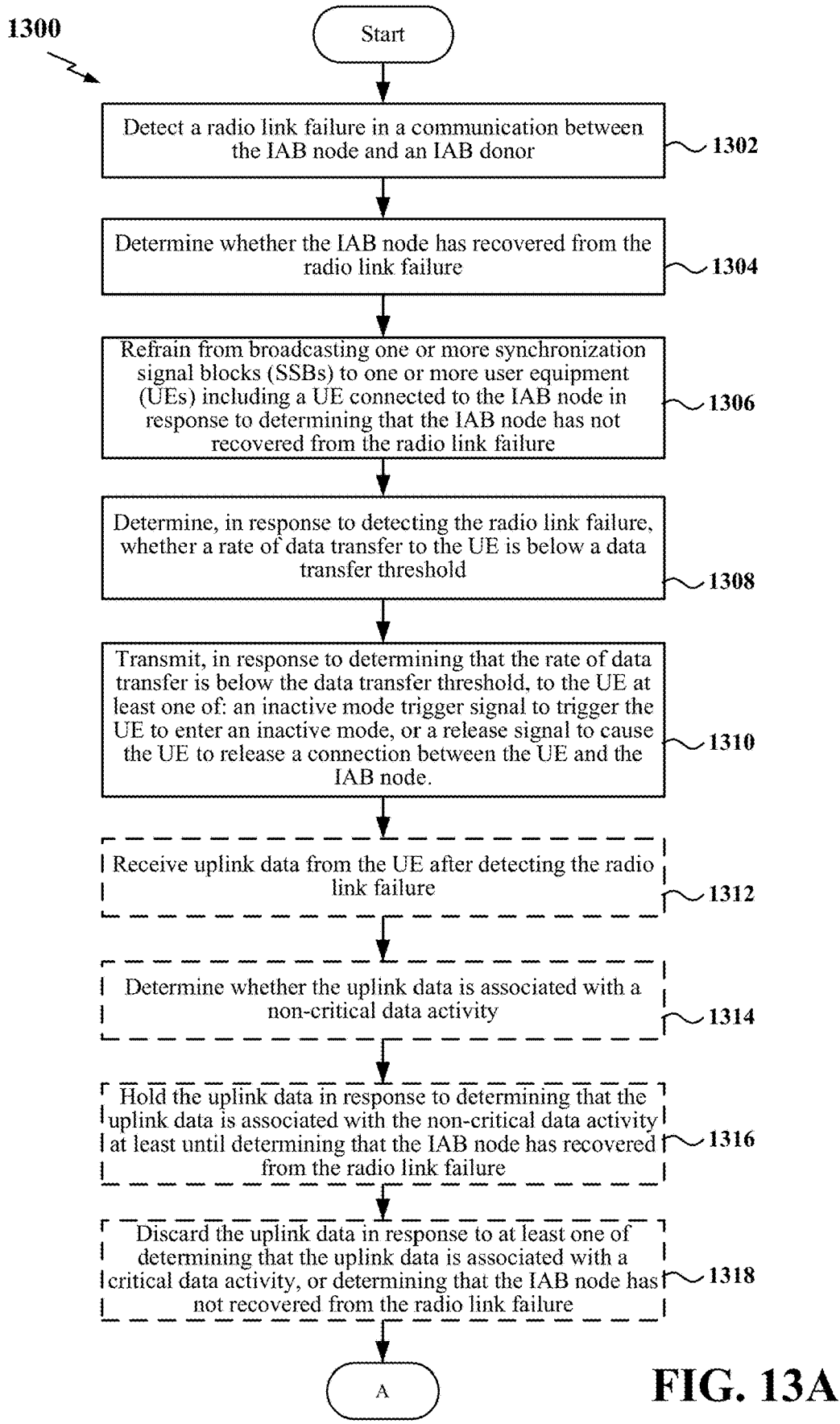
FIG. 13 (comprising FIGS. 13A and 13B) is a flow chart illustrating an exemplary process for wireless communication by an IAB node according to some aspects of the disclosure.
Figure 13B:
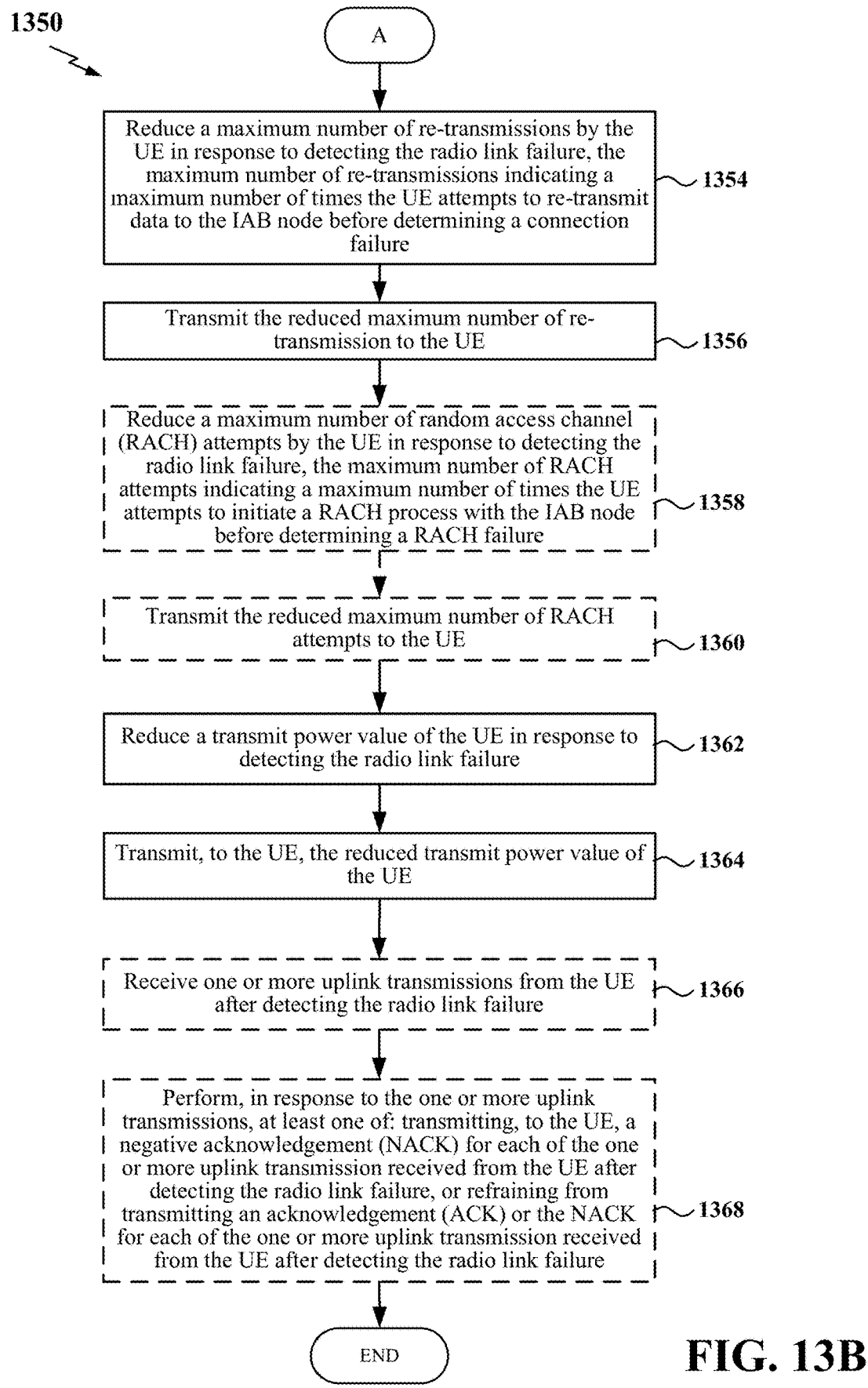

FIG. 13 (comprising FIGS. 13A and 13B) is a flow chart illustrating an exemplary process for wireless communication by an IAB node according to some aspects of the disclosure. As described below, some or all illustrated features may be omitted in a particular implementation within the scope of the present disclosure, and some illustrated features may not be required for implementation of all embodiments. In some examples, a process 1300 of FIG. 13A may be carried out by the IAB node 1100 illustrated in FIG. 11. In some examples, the process 1300 may be carried out by any suitable apparatus or means for carrying out the functions or algorithm described below.

At block 1302, the process 1300 may include detecting a radio link failure in a communication between the IAB node and an IAB donor. For example, the RLF management circuit 1140 shown and described above in connection with FIG. 11 may provide means for detecting the radio link failure.

In an aspect, detecting the radio link failure at block 1302 may include detecting the radio link failure in an upstream backhaul link of the IAB node.

In an aspect, detecting the radio link failure at block 1302 may include receiving a radio link failure indicator from a second IAB node connected to the IAB node, the radio link failure indicator indicating the radio link failure in an upstream backhaul link of the second IAB node, and determining the radio link failure in the communication between the IAB node and the IAB donor based on the radio link failure indicator.

At block 1304, the process 1300 may include determining whether the IAB node has recovered from the radio link failure. For example, the RLF management circuit 1140 shown and described above in connection with FIG. 11 may provide means for determining whether the IAB node has recovered from the radio link failure.

At block 1306, the process 1300 may include refraining from broadcasting one or more SSBs to one or more UEs including a UE connected to the IAB node in response to determining that the IAB node has not recovered from the radio link failure. For example, the communication management circuit 1142 shown and described above in connection with FIG. 11 may provide means for refraining from broadcasting the one or more SSBs.

In an aspect, determining that the IAB node has not recovered from the radio link failure comprises determining that the IAB node has not recovered from the radio link failure within a recovery time threshold.

In an aspect, determining that the IAB node has not recovered from the radio link failure comprises determining that the IAB node has not recovered from the radio link failure when the radio link failure is detected.

In an aspect, at block 1308, the process 1300 may include determining, in response to detecting the radio link failure, whether a rate of data transfer to the UE is below a data transfer threshold. For example, the communication management circuit 1142 shown and described above in connection with FIG. 11 may provide means for determining whether the rate of data transfer to the UE is below the data transfer threshold. In an aspect, the data transfer threshold may be based on a type of the data transfer.

In an aspect, at block 1310, the process 1300 may include transmitting, in response to determining that the rate of data transfer is below the data transfer threshold, to the UE at least one of an inactive mode trigger signal to trigger the UE to enter an inactive mode, or a release signal to cause the UE to release a connection between the UE and the IAB node. For example, the communication management circuit 1142 shown and described above in connection with FIG. 11 may provide means for transmitting to the UE at least one of the inactive mode trigger signal or the release signal. In an aspect, the at least one of the inactive mode trigger signal or the release signal may be transmitted via an RRC release message.

In an aspect, at block 1312, the process 1300 may include receiving uplink data from the UE after detecting the radio link failure. For example, the communication management circuit 1142 shown and described above in connection with FIG. 11 may provide means for receiving the uplink data.

In an aspect, at block 1314, the process 1300 may include determining whether the uplink data is associated with a non-critical data activity. For example, the communication management circuit 1142 shown and described above in connection with FIG. 11 may provide means for determining whether the uplink data is associated with the non-critical data activity.

In an aspect, at block 1316, the process 1300 may include holding, in response to determining that the uplink data is associated with the non-critical data activity, the uplink data at least until determining that the IAB node has recovered from the radio link failure. For example, the communication management circuit 1142 shown and described above in connection with FIG. 11 may provide means for holding the uplink data at least until determining that the IAB node has recovered from the radio link failure.

In an aspect, at block 1318, the process 1300 may include discarding the uplink data in response to at least one of determining that the uplink data is associated with a critical data activity, or determining that the IAB node has not recovered from the radio link failure. For example, the communication management circuit 1142 shown and described above in connection with FIG. 11 may provide means for discarding the uplink data.

In some examples, a process 1350 of FIG. 13B may be carried out by the IAB node 1100 illustrated in FIG. 11. In some examples, the process 1350 may be carried out by any suitable apparatus or means for carrying out the functions or algorithm described below.

In an aspect, at block 1354, the process 1350 may include reducing a maximum number of re-transmissions by the UE in response to detecting the radio link failure, the maximum number of re-transmissions indicating a maximum number of times the UE attempts to re-transmit data to the IAB node before determining a connection failure. For example, the UE configuration circuit 1144 shown and described above in connection with FIG. 11 may provide means for reducing the maximum number of re-transmissions.

In an aspect, at block 1356, the process 1350 may include transmitting the reduced maximum number of re-transmission to the UE. For example, the communication management circuit 1142 shown and described above in connection with FIG. 11 may provide means for transmitting the reduced maximum number of re-transmission to the UE. In an aspect, the reduced maximum number of re-transmissions may be transmitted via an RRC reconfiguration message.

In an aspect, at block 1358, the process 1350 may include reducing a maximum number of RACH attempts by the UE in response to detecting the radio link failure, the maximum number of RACH attempts indicating a maximum number of times the UE attempts to initiate a RACH process with the IAB node before determining a RACH failure. For example, the UE configuration circuit 1144 shown and described above in connection with FIG. 11 may provide means for reducing the maximum number of RACH attempts.

In an aspect, at block 1360, the process 1350 may include transmitting the reduced maximum number of RACH attempts to the UE. For example, the communication management circuit 1142 shown and described above in connection with FIG. 11 may provide means for transmitting the reduced maximum number of RACH attempts to the UE.

In an aspect, at block 1362, the process 1350 may include reducing a transmit power value of the UE in response to detecting the radio link failure. For example, the UE configuration circuit 1144 shown and described above in connection with FIG. 11 may provide means for reducing a the power value of the UE. In an aspect, the transmit power value may be a PUSCH transmit power value of the UE.

In an aspect, at block 1364, the process 1350 may include transmitting, to the UE, the reduced transmit power value of the UE. For example, the communication management circuit 1142 shown and described above in connection with FIG. 11 may provide means for transmitting the reduced transmit power value of the UE. In an aspect, the reduced transmit power value may be transmitted to the UE via a MAC-CE.

In an aspect, at block 1366, the process 1350 may include receiving one or more uplink transmissions from the UE after detecting the radio link failure. For example, the communication management circuit 1142 shown and described above in connection with FIG. 11 may provide means for receiving the one or more uplink transmissions.

In an aspect, at block 1368, the process 1350 may include performing, in response to the one or more uplink transmissions, at least one of transmitting, to the UE, a NACK for each of the one or more uplink transmission received from the UE after detecting the radio link failure, or refraining from transmitting an ACK or the NACK for each of the one or more uplink transmission received from the UE after detecting the radio link failure. For example, the communication management circuit 1142 shown and described above in connection with FIG. 11 may provide means for performing at least one of transmitting the NACK for each of the one or more uplink transmissions or refraining from transmitting the ACK or the NACK for each of the one or more uplink transmissions.

In one configuration, the IAB node 1100 for wireless communication includes means for detecting a radio link failure in a communication between the IAB node and an IAB donor, means for determining whether the IAB node has recovered from the radio link failure, and means for refraining from broadcasting one or more SSBs to one or more UEs including a UE connected to the IAB node in response to determining that the IAB node has not recovered from the radio link failure. In one aspect, the aforementioned means may be the processor 1104 shown in FIG. 11 configured to perform the functions recited by the aforementioned means. In another aspect, the aforementioned means may be a circuit or any apparatus configured to perform the functions recited by the aforementioned means.

Of course, in the above examples, the circuitry included in the processor 1104 is merely provided as an example, and other means for carrying out the described functions may be included within various aspects of the present disclosure, including but not limited to the instructions stored in the processor-readable storage medium 1106, or any other suitable apparatus or means described in any one of the FIGS. 1, 2, 4, and/or 6-10, and utilizing, for example, the processes and/or algorithms described herein in relation to FIG. 13.

The following provides an overview of several aspects of the present disclosure.

Aspect 1: A method of wireless communication by an integrated access backhaul (IAB) node, comprising: detecting a radio link failure in a communication between the IAB node and an IAB donor, determining whether the IAB node has recovered from the radio link failure, and refraining from broadcasting one or more synchronization signal blocks (SSBs) to one or more user equipment (UEs) including a UE connected to the IAB node in response to determining that the IAB node has not recovered from the radio link failure.

Aspect 2: The method of aspect 1, wherein detecting the radio link failure comprises detecting the radio link failure in an upstream backhaul link of the IAB node.

Aspect 3: The method of aspect 1 or 2, wherein detecting the radio link failure comprises: receiving a radio link failure indicator from a second IAB node connected to the IAB node, the radio link failure indicator indicating the radio link failure in an upstream backhaul link of the second IAB node, and determining the radio link failure in the communication between the IAB node and the IAB donor based on the radio link failure indicator.

Aspect 4: The method of any one of aspects 1 through 3, wherein determining that the IAB node has not recovered from the radio link failure comprises determining that the IAB node has not recovered from the radio link failure within a recovery time threshold.

Aspect 5: The method of any one of aspects 1 through 3, wherein determining that the IAB node has not recovered from the radio link failure comprises determining that the IAB node has not recovered from the radio link failure when the radio link failure is detected.

Aspect 6: The method of any one of aspects 1 through 5, further comprising: determining, in response to detecting the radio link failure, whether a rate of data transfer to the UE is below a data transfer threshold, and transmitting, in response to determining that the rate of data transfer is below the data transfer threshold, to the UE at least one of an inactive mode trigger signal to trigger the UE to enter an inactive mode, or a release signal to cause the UE to release a connection between the UE and the IAB node.

Aspect 7: The method of aspect 6, wherein the data transfer threshold is based on a type of the data transfer.

Aspect 8: The method of aspect 6 or 7, wherein the at least one of the inactive mode trigger signal or the release signal is transmitted via a radio resource control (RRC) release message.

Aspect 9: The method of any of aspects 1 through 8, further comprising: reducing a maximum number of re-transmissions by the UE in response to detecting the radio link failure, the maximum number of re-transmissions indicating a maximum number of times the UE attempts to re-transmit data to the IAB node before determining a connection failure, and transmitting the reduced maximum number of re-transmission to the UE.

Aspect 10: The method of aspect 9, wherein the reduced maximum number of re-transmissions is transmitted via a radio resource control (RRC) reconfiguration message.

Aspect 11: The method of any of aspects 1 through 10, further comprising: reducing a maximum number of random access channel (RACH) attempts by the UE in response to detecting the radio link failure, the maximum number of RACH attempts indicating a maximum number of times the UE attempts to initiate a RACH process with the IAB node before determining a RACH failure, and transmitting the reduced maximum number of RACH attempts to the UE.

Aspect 12: The method of any of aspects 1 through 11, further comprising: reducing a transmit power value of the UE in response to detecting the radio link failure, and transmitting, to the UE, the reduced transmit power value of the UE.

Aspect 13: The method of aspect 12, wherein the reduced transmit power value is transmitted to the UE via a media access control (MAC) control element (CE).

Aspect 14: The method of aspect 12 or 13, wherein the transmit power value is a physical uplink shared channel (PUSCH) transmit power value of the UE.

Aspect 15: The method of any of aspects 12 through 14, further comprising: receiving one or more uplink transmissions from the UE after detecting the radio link failure, and performing, in response to the one or more uplink transmissions, at least one of: transmitting, to the UE, a negative acknowledgement (NACK) for each of the one or more uplink transmission received from the UE after detecting the radio link failure, or refraining from transmitting an acknowledgement (ACK) or the NACK for each of the one or more uplink transmission received from the UE after detecting the radio link failure.

Aspect 16: The method of any of aspects 1 through 15, further comprising: receiving uplink data from the UE after detecting the radio link failure, determining whether the uplink data is associated with a non-critical data activity, and holding, in response to determining that the uplink data is associated with the non-critical data activity, the uplink data at least until determining that the IAB node has recovered from the radio link failure.

Aspect 17: The method of aspect 16, further comprising: discarding the uplink data in response to at least one of determining that the uplink data is associated with a critical data activity, or determining that the IAB node has not recovered from the radio link failure.

Aspect 18: An IAB node configured for wireless communication comprising at least one processor, a transceiver communicatively coupled to the at least one processor, and a memory communicatively coupled to the at least one processor, wherein the at least one processor is configured to perform any one of aspects 1 through 17.

Aspect 19: An IAB node configured for wireless communication comprising at least one means for performing any one of aspects 1 through 17.

Aspect 20: A non-transitory processor-readable storage medium having instructions for an IAB node thereon, wherein the instructions, when executed by a processing circuit, cause the processing circuit to perform any one of aspects 1 through 17.

Several aspects of a wireless communication network have been presented with reference to an exemplary implementation. As those skilled in the art will readily appreciate, various aspects described throughout this disclosure may be extended to other telecommunication systems, network architectures and communication standards.

By way of example, various aspects may be implemented within other systems defined by 3GPP, such as Long-Term Evolution (LTE), the Evolved Packet System (EPS), the Universal Mobile Telecommunication System (UMTS), and/or the Global System for Mobile (GSM). Various aspects may also be extended to systems defined by the 3rd Generation Partnership Project 2 (3GPP2), such as CDMA2000 and/or Evolution-Data Optimized (EV-DO). Other examples may be implemented within systems employing IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The term "coupled" is used herein to refer to the direct or indirect coupling between two objects. For example, if object A physically touches object B, and object B touches object C, then objects A and C may still be considered coupled to one another—even if they do not directly physically touch each other. For instance, a first object may be coupled to a second object even though the first object is never directly physically in contact with the second object. The terms "circuit" and "circuitry" are used broadly, and intended to include both hardware implementations of electrical devices and conductors that, when connected and configured, enable the performance of the functions described in the present disclosure, without limitation as to the type of electronic circuits, as well as software implementations of information and instructions that, when executed by a processor, enable the performance of the functions described in the present disclosure.

One or more of the components, steps, features and/or functions illustrated in FIGS. 1-13 may be rearranged and/or combined into a single component, step, feature or function or embodied in several components, steps, or functions. Additional elements, components, steps, and/or functions may also be added without departing from novel features disclosed herein. The apparatus, devices, and/or components illustrated in FIGS. 1-13 may be configured to perform one or more of the methods, features, or steps described herein. The novel algorithms described herein may also be efficiently implemented in software and/or embedded in hardware.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

What is claimed is:

1. A method of wireless communication by an integrated access backhaul (IAB) node, comprising:
   detecting a radio link failure in a communication between the IAB node and an IAB donor;
   determining whether the IAB node has recovered from the radio link failure;
   refraining from broadcasting one or more synchronization signal blocks (SSBs) to one or more user equipment (UEs) including a UE connected to the IAB node in response to determining that the IAB node has not recovered from the radio link failure;
   reducing a maximum number of re-transmissions by the UE in response to detecting the radio link failure, the maximum number of re-transmissions indicating a maximum number of times the UE attempts to re-transmit data to the IAB node before determining a connection failure; and
   transmitting the reduced maximum number of re-transmissions to the UE.

2. The method of claim 1, wherein detecting the radio link failure comprises detecting the radio link failure in an upstream backhaul link of the IAB node.

3. The method of claim 1, wherein detecting the radio link failure comprises:
   receiving a radio link failure indicator from a second IAB node connected to the IAB node, the radio link failure indicator indicating the radio link failure in an upstream backhaul link of the second IAB node; and
   determining the radio link failure in the communication between the IAB node and the IAB donor based on the radio link failure indicator.

4. The method of claim 1, wherein determining that the IAB node has not recovered from the radio link failure comprises determining that the IAB node has not recovered from the radio link failure within a recovery time threshold.

5. The method of claim 1, wherein determining that the IAB node has not recovered from the radio link failure comprises determining that the IAB node has not recovered from the radio link failure when the radio link failure is detected.

6. The method of claim 1, further comprising:
   determining, in response to detecting the radio link failure, whether a rate of data transfer to the UE is below a data transfer threshold; and
   transmitting, in response to determining that the rate of data transfer is below the data transfer threshold, to the UE at least one of
      an inactive mode trigger signal to trigger the UE to enter an inactive mode, or
      a release signal to cause the UE to release a connection between the UE and the IAB node.

7. The method of claim 6, wherein the data transfer threshold is based on a type of the data transfer.

8. The method of claim 6, wherein the at least one of the inactive mode trigger signal or the release signal is transmitted via a radio resource control (RRC) release message.

9. The method of claim 1, wherein the reduced maximum number of re-transmissions is transmitted via a radio resource control (RRC) reconfiguration message.

10. The method of claim 1, further comprising:
    reducing a maximum number of random access channel (RACH) attempts by the UE in response to detecting the radio link failure, the maximum number of RACH attempts indicating a maximum number of times the UE attempts to initiate a RACH process with the IAB node before determining a RACH failure; and
    transmitting the reduced maximum number of RACH attempts to the UE.

11. The method of claim 1, further comprising:
    reducing a transmit power value of the UE in response to detecting the radio link failure; and
    transmitting, to the UE, the reduced transmit power value of the UE.

12. The method of claim 11, wherein the reduced transmit power value is transmitted to the UE via a media access control (MAC) control element (CE).

13. The method of claim 11, wherein the transmit power value is a physical uplink shared channel (PUSCH) transmit power value of the UE.

14. The method of claim 11, further comprising:
    receiving one or more uplink transmissions from the UE after detecting the radio link failure; and
    performing, in response to the one or more uplink transmissions, at least one of:
       transmitting, to the UE, a negative acknowledgement (NACK) for each of the one or more uplink transmission received from the UE after detecting the radio link failure, or
       refraining from transmitting an acknowledgement (ACK) or the NACK for each of the one or more uplink transmission received from the UE after detecting the radio link failure.

15. The method of claim 1, further comprising:
    receiving uplink data from the UE after detecting the radio link failure;
    determining whether the uplink data is associated with a non-critical data activity; and
    holding, in response to determining that the uplink data is associated with the non-critical data activity, the uplink data at least until determining that the IAB node has recovered from the radio link failure.

16. The method of claim 15, further comprising:
    discarding the uplink data in response to at least one of
       determining that the uplink data is associated with a critical data activity, or
       determining that the IAB node has not recovered from the radio link failure.

17. An integrated access backhaul (IAB) node for wireless communication, comprising:
    at least one processor;
    a transceiver communicatively coupled to the at least one processor; and
    a memory communicatively coupled to the at least one processor,
    wherein the at least one processor is configured to:
       detect a radio link failure in a communication between the IAB node and an IAB donor;
       determine whether the IAB node has recovered from the radio link failure;
       refrain from broadcasting one or more synchronization signal blocks (SSBs) to one or more user equipment (UEs) including a UE connected to the IAB node in response to determining that the IAB node has not recovered from the radio link failure;

reduce a maximum number of re-transmissions by the UE in response to detecting the radio link failure, the maximum number of re-transmissions indicating a maximum number of times the UE attempts to re-transmit data to the IAB node before determining a connection failure; and transmit the reduced maximum number of re-transmissions to the UE.

18. The IAB node of claim 17, wherein the at least one processor configured to detect the radio link failure is configured to detect the radio link failure in an upstream backhaul link of the IAB node.

19. The IAB node of claim 17, wherein the at least one processor configured to detect the radio link failure is configured to:

receive a radio link failure indicator from a second IAB node connected to the IAB node, the radio link failure indicator indicating the radio link failure in an upstream backhaul link of the second IAB node; and determine the radio link failure in the communication between the IAB node and the IAB donor based on the radio link failure indicator.

20. The IAB node of claim 17, wherein the at least one processor configured to determine that the IAB node has not recovered from the radio link failure is configured to determine that the IAB node has not recovered from the radio link failure within a recovery time threshold.

21. The IAB node of claim 17, wherein the at least one processor configured to determine that the IAB node has not recovered from the radio link failure is configured to determine that the IAB node has not recovered from the radio link failure when the radio link failure is detected.

22. The IAB node of claim 17, wherein the at least one processor is further configured to:

determine, in response to detecting the radio link failure, whether a rate of data transfer to the UE is below a data transfer threshold; and transmit, in response to determining that the rate of data transfer is below the data transfer threshold, to the UE at least one of
an inactive mode trigger signal to trigger the UE to enter an inactive mode, or
a release signal to cause the UE to release a connection between the UE and the IAB node.

23. The IAB node of claim 22, wherein the data transfer threshold is based on a type of the data transfer.

24. The IAB node of claim 18, wherein the reduced maximum number of re-transmissions is transmitted via a radio resource control (RRC) reconfiguration message.

25. The IAB node of claim 17, wherein the at least one processor is further configured to:

reduce a maximum number of random access channel (RACH) attempts by the UE in response to detecting the radio link failure, the maximum number of RACH attempts indicating a maximum number of times the UE attempts to initiate a RACH process with the IAB node before determining a RACH failure; and transmit the reduced maximum number of RACH attempts to the UE.

26. The IAB node of claim 17, wherein the at least one processor is further configured to:

reduce a transmit power value of the UE in response to detecting the radio link failure; and transmit, to the UE, the reduced transmit power value of the UE.

27. A non-transitory processor-readable storage medium having instructions for an integrated access backhaul (IAB) node thereon, wherein the instructions, when executed by a processing circuit, cause the processing circuit to:

detect a radio link failure in a communication between the IAB node and an IAB donor;

determine whether the IAB node has recovered from the radio link failure;

refrain from broadcasting one or more synchronization signal blocks (SSBs) to one or more user equipment (UEs) including a UE connected to the IAB node in response to determining that the IAB node has not recovered from the radio link failure;

reduce a maximum number of re-transmissions by the UE in response to detecting the radio link failure, the maximum number of re-transmissions indicating a maximum number of times the UE attempts to re-transmit data to the IAB node before determining a connection failure; and transmit the reduced maximum number of re-transmissions to the UE.

28. An integrated access backhaul (IAB) node for wireless communication, comprising:

means for detecting a radio link failure in a communication between the IAB node and an IAB donor;

means for determining whether the IAB node has recovered from the radio link failure;

means for refraining from broadcasting one or more synchronization signal blocks (SSBs) to one or more user equipment (UEs) including a UE connected to the IAB node in response to determining that the IAB node has not recovered from the radio link failure;

means for reducing a maximum number of re-transmissions by the UE in response to detecting the radio link failure, the maximum number of re-transmissions indicating a maximum number of times the UE attempts to re-transmit data to the IAB node before determining a connection failure; and means for transmitting the reduced maximum number of re-transmissions to the UE.

* * * * *